(12) United States Patent
Grant et al.

(10) Patent No.: US 8,887,990 B2
(45) Date of Patent: Nov. 18, 2014

(54) ATTRIBUTING HARVEST INFORMATION WITH UNIQUE IDENTIFIERS

(75) Inventors: Elliott Grant, Woodside, CA (US); Albert Anthony Luna, Redwood City, CA (US); Juan Garibay, Milpitas, CA (US)

(73) Assignee: YottaMark, Inc., Redwood City, CA (US)

(*) Notice: Subject to any disclaimer, the term of this patent is extended or adjusted under 35 U.S.C. 154(b) by 106 days.

(21) Appl. No.: 13/554,502

(22) Filed: Jul. 20, 2012

(65) Prior Publication Data

US 2012/0280042 A1 Nov. 8, 2012

Related U.S. Application Data

(63) Continuation-in-part of application No. 13/053,200, filed on Mar. 21, 2011, now Pat. No. 8,342,393, which is a continuation-in-part of application No. 12/206,156, filed on Sep. 8, 2008, now Pat. No. 7,909,239, said application No. 13/554,502 is a continuation-in-part of application No. 13/449,145, filed on Apr. 17, 2012, now Pat. No. 8,286,869, which is a continuation of application No. 13/221,520, filed on Aug. 30, 2011, now Pat. No. 8,196,827, which is a continuation-in-part of application No. 12/471,201, filed on May 22, 2009, now Pat. No. 8,152,063.

(60) Provisional application No. 60/970,933, filed on Sep. 7, 2007.

(51) Int. Cl.
*G06F 17/00* (2006.01)
*G06Q 10/08* (2012.01)
*G06Q 50/02* (2012.01)

(52) U.S. Cl.
CPC ............... *G06Q 10/08* (2013.01); *G06Q 50/02* (2013.01)
USPC .......................................... 235/375; 235/383

(58) Field of Classification Search
CPC ....... G06Q 30/06; G06Q 10/087; G06Q 10/08
USPC ............... 235/375, 383, 385, 462.15, 462.01, 235/462.09
See application file for complete search history.

(56) References Cited

U.S. PATENT DOCUMENTS

| 3,329,181 A | 7/1967 | Buss |
| 4,191,376 A | 3/1980 | Goldman et al. |

(Continued)

FOREIGN PATENT DOCUMENTS

| CN | 1350265 A | 5/2002 |
| EP | 2175409 A2 | 4/2010 |

(Continued)

OTHER PUBLICATIONS

PCT/US08/75626 International Search Report and Written Opinion, Nov. 26, 2008.

(Continued)

*Primary Examiner* — Kristy A Haupt
(74) *Attorney, Agent, or Firm* — Peters Verny, LLP

(57) ABSTRACT

Systems and methods allow units of produce to be traced back to the fields in which the produce was grown. In the field, a harvest form is completed with harvest information at the time of the harvest. In some instances, labels having unique codes are used to label the produce in the field, and an additional label is placed on the harvest form to associate a range of unique codes for an entire roll of labels with the harvest information on the form. In the alternative, the label can be read, such as with a hand-held device and associated with harvest information also entered through the hand-held device.

11 Claims, 14 Drawing Sheets

(56) References Cited

U.S. PATENT DOCUMENTS

| | | |
|---|---|---|
| 4,385,482 A | 5/1983 | Booth |
| 4,526,404 A | 7/1985 | Vazquez |
| 4,544,590 A | 10/1985 | Egan |
| 4,650,218 A | 3/1987 | Hawke |
| 4,791,565 A | 12/1988 | Dunham et al. |
| 4,832,204 A | 5/1989 | Handy et al. |
| 4,846,504 A | 7/1989 | MacGregor et al. |
| 5,136,826 A | 8/1992 | Carson et al. |
| 5,198,644 A | 3/1993 | Pfeiffer et al. |
| 5,271,642 A | 12/1993 | Jahier et al. |
| 5,343,529 A | 8/1994 | Goldfine et al. |
| 5,360,628 A | 11/1994 | Butland |
| 5,361,904 A | 11/1994 | Kapec et al. |
| 5,478,990 A | 12/1995 | Montanari et al. |
| 5,486,686 A | 1/1996 | Zdybel, Jr. et al. |
| 5,561,970 A | 10/1996 | Edie et al. |
| 5,569,317 A | 10/1996 | Sarada et al. |
| 5,592,561 A | 1/1997 | Moore |
| 5,611,948 A | 3/1997 | Hawkins |
| 5,619,416 A | 4/1997 | Kosarew |
| 5,668,803 A | 9/1997 | Tymes et al. |
| 5,695,071 A | 12/1997 | Ross et al. |
| 5,768,384 A | 6/1998 | Berson |
| 5,793,030 A | 8/1998 | Kelly, Jr. |
| 5,895,073 A | 4/1999 | Moore |
| 5,917,925 A | 6/1999 | Moore |
| 5,962,834 A | 10/1999 | Markman |
| 6,005,960 A | 12/1999 | Moore |
| 6,041,929 A | 3/2000 | Brunner et al. |
| 6,111,953 A | 8/2000 | Walker et al. |
| 6,203,069 B1 | 3/2001 | Outwater et al. |
| 6,211,789 B1 | 4/2001 | Oldham et al. |
| 6,212,638 B1 | 4/2001 | Lee et al. |
| 6,226,619 B1 | 5/2001 | Halperin et al. |
| 6,231,435 B1 | 5/2001 | Pilger |
| 6,246,778 B1 | 6/2001 | Moore |
| 6,297,508 B1 | 10/2001 | Barmore et al. |
| 6,305,942 B1 | 10/2001 | Block et al. |
| 6,314,337 B1 | 11/2001 | Marcum |
| 6,329,920 B1 | 12/2001 | Morrison et al. |
| 6,342,839 B1 | 1/2002 | Curkendall et al. |
| 6,346,885 B1 | 2/2002 | Curkendall |
| 6,361,079 B1 | 3/2002 | Kirkman |
| 6,364,990 B1 | 4/2002 | Grosskopf et al. |
| 6,398,106 B1 | 6/2002 | Ulvr et al. |
| 6,409,082 B1 | 6/2002 | Davis et al. |
| 6,428,640 B1 | 8/2002 | Stevens et al. |
| 6,442,276 B1 | 8/2002 | Doljack |
| 6,456,729 B1 | 9/2002 | Moore |
| 6,473,739 B1 | 10/2002 | Showghi et al. |
| 6,536,672 B1 | 3/2003 | Outwater |
| 6,547,137 B1 | 4/2003 | Begelfer et al. |
| 6,612,494 B1 | 9/2003 | Outwater |
| 6,664,897 B2 | 12/2003 | Pape et al. |
| 6,680,783 B1 | 1/2004 | Pierce et al. |
| 6,766,324 B2 | 7/2004 | Carlson et al. |
| 6,788,800 B1 | 9/2004 | Carr et al. |
| 6,796,504 B2 | 9/2004 | Robinson |
| 6,805,926 B2 | 10/2004 | Cole et al. |
| 6,806,478 B1 | 10/2004 | Hatfield |
| 6,808,574 B1 | 10/2004 | Stevens et al. |
| 6,859,672 B2 | 2/2005 | Roberts et al. |
| 6,974,298 B2 | 12/2005 | Tanaka |
| 6,991,261 B2 | 1/2006 | Dronzek, Jr. et al. |
| 6,995,675 B2 | 2/2006 | Curkendall et al. |
| 6,996,543 B1 | 2/2006 | Coppersmith et al. |
| 7,013,286 B1 | 3/2006 | Aggarwal et al. |
| 7,040,532 B1 | 5/2006 | Taylor et al. |
| 7,043,442 B2 | 5/2006 | Levy et al. |
| 7,207,481 B2 | 4/2007 | Barenburg et al. |
| 7,211,163 B2 | 5/2007 | Kennedy |
| 7,222,791 B2 | 5/2007 | Heilper et al. |
| 7,261,235 B2 | 8/2007 | Barenburg et al. |
| 7,277,601 B2 | 10/2007 | Zorab et al. |
| 7,283,630 B1 | 10/2007 | Doljack |
| 7,295,114 B1 | 11/2007 | Drzaic et al. |
| 7,321,310 B2 | 1/2008 | Curkendall et al. |
| 7,412,461 B2 | 8/2008 | Sholl et al. |
| 7,519,825 B2 | 4/2009 | Geoffrey |
| 7,680,691 B2 | 3/2010 | Kimball et al. |
| 7,686,513 B2 | 3/2010 | Knoerzer et al. |
| 7,705,735 B2 | 4/2010 | Pape et al. |
| 7,714,729 B2 | 5/2010 | Pape et al. |
| 7,766,240 B1 | 8/2010 | Grant |
| 7,810,726 B2 | 10/2010 | de la Huerga |
| 7,827,058 B2 | 11/2010 | Mortimer |
| 7,909,239 B2 | 3/2011 | Grant et al. |
| 8,019,662 B2 | 9/2011 | Lucas |
| 8,108,309 B2 | 1/2012 | Tan |
| 8,140,852 B2 | 3/2012 | Guenter et al. |
| 8,284,988 B2 | 10/2012 | Sones et al. |
| 8,496,173 B2 | 7/2013 | Anselment et al. |
| 2001/0056359 A1 | 12/2001 | Abreu |
| 2002/0004767 A1 | 1/2002 | Okamoto et al. |
| 2002/0131442 A1 | 9/2002 | Garg et al. |
| 2002/0158765 A1 | 10/2002 | Pape et al. |
| 2002/0178363 A1 | 11/2002 | Ambrogio et al. |
| 2003/0019186 A1 | 1/2003 | Hakansson |
| 2003/0080191 A1 | 5/2003 | Lubow et al. |
| 2003/0089078 A1 | 5/2003 | Christina |
| 2003/0165799 A1 | 9/2003 | Bisogno |
| 2003/0171944 A1 | 9/2003 | Fine et al. |
| 2003/0177025 A1 | 9/2003 | Curkendall et al. |
| 2003/0177095 A1 | 9/2003 | Zorab et al. |
| 2003/0185948 A1 | 10/2003 | Garwood |
| 2003/0221108 A1 | 11/2003 | Rupp |
| 2004/0065053 A1 | 4/2004 | Rice et al. |
| 2004/0159527 A1 | 8/2004 | Williamson |
| 2004/0167829 A1 | 8/2004 | Fujita |
| 2004/0200892 A1 | 10/2004 | Curkendall et al. |
| 2004/0205343 A1 | 10/2004 | Forth et al. |
| 2004/0230796 A1 | 11/2004 | Lundvall et al. |
| 2005/0004682 A1 | 1/2005 | Gaddis et al. |
| 2005/0038756 A1 | 2/2005 | Nagel |
| 2005/0075900 A1 | 4/2005 | Arguimbau, III |
| 2005/0097054 A1 | 5/2005 | Dillon |
| 2005/0108044 A1 | 5/2005 | Koster |
| 2005/0113649 A1 | 5/2005 | Bergantino |
| 2005/0182695 A1 | 8/2005 | Lubow et al. |
| 2005/0206586 A1 | 9/2005 | Capurso et al. |
| 2005/0247778 A1 | 11/2005 | Roberts |
| 2005/0251449 A1 | 11/2005 | Pape et al. |
| 2005/0288947 A1 | 12/2005 | Mallonee et al. |
| 2006/0004907 A1 | 1/2006 | Pape et al. |
| 2006/0022059 A1 | 2/2006 | Juds |
| 2006/0054682 A1 | 3/2006 | de la Huerga et al. |
| 2006/0074716 A1 | 4/2006 | Tilles et al. |
| 2006/0100964 A1 | 5/2006 | Wilde et al. |
| 2006/0111845 A1* | 5/2006 | Forbis et al. .................. 702/19 |
| 2006/0161443 A1 | 7/2006 | Rollins |
| 2006/0180661 A1 | 8/2006 | Grant et al. |
| 2006/0187048 A1 | 8/2006 | Curkendall et al. |
| 2006/0199155 A1 | 9/2006 | Mosher |
| 2006/0201432 A1 | 9/2006 | Pratt |
| 2006/0259182 A1 | 11/2006 | Mantell |
| 2006/0260495 A1 | 11/2006 | Siedlaczek |
| 2006/0266827 A1 | 11/2006 | Hamilton |
| 2006/0289654 A1 | 12/2006 | Robinson et al. |
| 2007/0001006 A1 | 1/2007 | Schuessler et al. |
| 2007/0051362 A1 | 3/2007 | Sullivan et al. |
| 2007/0118357 A1 | 5/2007 | Kasravi et al. |
| 2007/0119954 A1 | 5/2007 | Barenburg et al. |
| 2007/0119955 A1 | 5/2007 | Barenburg et al. |
| 2007/0170240 A1 | 7/2007 | Grant et al. |
| 2007/0175974 A1 | 8/2007 | Self et al. |
| 2007/0203724 A1 | 8/2007 | Farmer et al. |
| 2007/0203818 A1 | 8/2007 | Farmer et al. |
| 2007/0205258 A1 | 9/2007 | Self et al. |
| 2008/0011841 A1 | 1/2008 | Self et al. |
| 2008/0011843 A1 | 1/2008 | Barenburg et al. |
| 2008/0023472 A1 | 1/2008 | Brandt |
| 2008/0030348 A1 | 2/2008 | Pape et al. |
| 2008/0046263 A1 | 2/2008 | Sager et al. |
| 2008/0083825 A1 | 4/2008 | Yang et al. |

(56) References Cited

U.S. PATENT DOCUMENTS

| | | |
|---|---|---|
| 2008/0143094 A1 | 6/2008 | Goetz |
| 2008/0178197 A1 | 7/2008 | Pape et al. |
| 2008/0215484 A1 | 9/2008 | Oldham et al. |
| 2009/0006127 A1 | 1/2009 | Bahar |
| 2009/0065568 A1 | 3/2009 | Grant et al. |
| 2009/0164466 A1 | 6/2009 | Badyal |
| 2009/0242631 A1 | 10/2009 | Wishnatzki et al. |
| 2009/0275002 A1 | 11/2009 | Hoggle |
| 2010/0106660 A1 | 4/2010 | Farmer et al. |
| 2010/0112680 A1 | 5/2010 | Brockwell et al. |
| 2010/0124359 A1 | 5/2010 | Vaidya |
| 2010/0145730 A1 | 6/2010 | Abreu |
| 2010/0292998 A1 | 11/2010 | Bodlaender et al. |
| 2011/0035326 A1 | 2/2011 | Stoll et al. |
| 2011/0098026 A1 | 4/2011 | Uland |
| 2012/0037697 A1 | 2/2012 | Boone et al. |
| 2012/0084119 A1 | 4/2012 | Vandehey et al. |

FOREIGN PATENT DOCUMENTS

| | | |
|---|---|---|
| JP | 2000011114 A2 | 1/2000 |
| JP | 2002140449 A2 | 5/2002 |
| WO | 03007252 A1 | 1/2003 |
| WO | 2004075098 A1 | 9/2004 |
| WO | 2006084090 A2 | 8/2006 |
| WO | 2007140018 A2 | 6/2007 |

OTHER PUBLICATIONS

Secure Symbology, Inc. Business Overview, May 2008.

Paul Chang, IBM Industry Forum 2010, Mexico Industry Event, 2010.

PCT/US06/03768 International Search Report and Written Opinion, Jun. 12, 2008.

"CRC: Implementation," http://www.relisoft.com/science/CrcNaive.html, 2006.

YottaMark, Inc., YottaMark Launches HarvestMark for Cases, Aug. 2008, Gastoenterology Week, 676, http://search.proquest.com/docview/237361750?accountid=14753.

Grant, E., "Traceability: Giving every product an authentic identity" Jun. 2008, PackagePrinting, vol. 55, Iss. 6, pp. 30-33.

Shibiata et al., "Mechanism-based PKI," Computer System Symposium 2003, vol. 2003 (15), pp. 181-186, (1998); English Abstract.

"Fraud Contermeasures and Control," Committee Draft ISO/CD 16678, Apr. 20, 2012.

Ilic, A. "The Value of Sensor Information for the Management of Perishable Goods—A simulation Study," Jun. 4, 2008.

Roberti, M., "RFID Will Help Keep Perishables Fresh," RFID Journal, Inc., Aug. 3, 2005.

Yoshinori Takagi, "Personal Certification and Identification—Finger Print DNA," Monthly Electronics Magazine, vol. 43 (2), pp. 55-57, (1998).

U.S. Appl. No. 12/206,156 non-final Office action, mailed Nov. 15, 2010.

U.S. Appl. No. 12/206,156 Applicants' Amendment A response submitted Jan. 10, 2011.

U.S. Appl. No. 12/471,201 non-final Office action, mailed Jul. 29, 2011.

U.S. Appl. No. 12/471,201 Applicants' Amendment A response submitted Oct. 8, 2011.

U.S. Appl. No. 12/471,201 final Office action, mailed Feb. 28, 2012.

U.S. Appl. No. 12/471,201 Applicants' Amendment B response submitted Feb. 13, 2012.

U.S. Appl. No. 13/053,200 non-final Office action, mailed Aug. 15, 2012.

U.S. Appl. No. 13/053,200 Applicants' Amendment A response submitted Nov. 5, 2012.

U.S. Appl. No. 13/221,520 non-final Office action, mailed Jan. 5, 2012.

U.S. Appl. No. 13/221,520 Applicants' Amendment A response submitted Mar. 15, 2012.

U.S. Appl. No. 13/449,145 non-final Office action, mailed May 24, 2012.

U.S. Appl. No. 13/449,145 Applicants' Amendment A response submitted Jul. 30, 2012.

* cited by examiner

FIG. 1

ATTRIBUTING HARVEST INFORMATION WITH UNIQUE IDENTIFIERS

CROSS-REFERENCE TO RELATED APPLICATIONS

This application is a Continuation-In-Part of U.S. patent application Ser. No. 13/053,200 filed on Mar. 21, 2011 now U.S. Pat. No. 8,342,393 and entitled "Attributing Harvest Information with Unique Identifiers" which is a Continuation-In-Part of U.S. patent application Ser. No. 12/206,156 filed on Sep. 8, 2008 and also entitled "Attributing Harvest Information with Unique Identifiers," now U.S. Pat. No. 7,909,239, which claims the benefit of U.S. Provisional Patent Application No. 60/970,933 filed on Sep. 7, 2007 and similarly entitled "Attributing Harvest Information with Unique Identifiers" each of which is incorporated herein by reference; this application is additionally a Continuation-In-Part of U.S. patent application Ser. No. 13/449,145 filed on Apr. 17, 2012 now U.S. Pat. No. 8,286,869 and entitled "Case Labeling for Field-Packed Produce" which is a Continuation of U.S. patent application Ser. No. 13/221,520 filed on Aug. 30, 2011 and also entitled "Case Labeling for Field-Packed Produce," now U.S. Pat. No. 8,196,827, which is a Continuation-In-Part of U.S. patent application Ser. No. 12/471,201 filed on May 22, 2009 and also entitled "Case Labeling for Field-Packed Produce," now U.S. Pat. No. 8,152,063, each of which is further incorporated herein by reference. This application is related to U.S. patent application Ser. No. 11/619,747 filed on Jan. 4, 2007 and entitled "System and Method of Code Generation and Authentication," now U.S. Pat. No. 7,823,768, to U.S. patent application Ser. No. 11/347,424 filed on Feb. 2, 2006 and entitled "Method and System for Deterring Product Counterfeiting, Diversion and Piracy," now U.S. Pat. No. 7,614,546, to U.S. patent application Ser. No. 12/054,654 filed on Mar. 25, 2008 and entitled "Systems and Methods for Associating Production Attributes with Products," and also to U.S. Pat. No. 7,766,240 filed on Jul. 19, 2008 and entitled "Case-Level Traceability Without the Need for Inline Printing" each of which is incorporated herein by reference.

BACKGROUND OF THE INVENTION

1. Field of the Invention

The present invention relates generally to the field of consumer product traceability, and more specifically to unit-level traceability for products such as fresh produce.

2. Description of the Prior Art

When a problem with contaminated food arises, a significant issue is identifying the source of the contamination. With contaminated produce, being able to quickly identify the growers and the specific fields that are the source of the contamination is important to enable prompt remedial action to protect the public health and to restore public confidence in the food supply chain. It is also desirable to be able to easily identify which produce is affected and which is safe. Restoring public confidence and being able to readily identify unaffected produce help prevent large declines in sales volumes and the unnecessary destruction of substantial amounts of safe produce.

Presently, the complex and global supply chain makes the process of identifying the sources of the contaminated produce slow and cumbersome.

SUMMARY

An exemplary method for associating information with harvested produce is provided. The exemplary method comprises recording harvest information on a harvest form, affixing a pair of labels to the harvest form and affixing individual labels to produce being harvested, where each of the labels includes a unique code. The method further comprises creating a record that associates the harvest information with a range defined by the unique codes on the pair of labels. In some embodiments, affixing the pair of labels to the harvest form and affixing individual labels to produce being harvested comprises removing a first label from a roll of labels and affixing the first label to the harvest form, removing the individual labels from the roll after removing the first label and affixing the individual labels to produce being harvested, and after removing the individual labels from the roll, removing a last label from the roll and affixing the last label to the harvest form.

In various embodiments, produce being harvested comprises bulk loose produce or item-level packages such as bags, trays, and clamshells. Also in various embodiments, the unique codes can comprise cipher texts of plain text codes, where the plain text codes follow a sequence or pattern. In some of these embodiments, the range defined by the unique codes on the pair of labels is a range defined between the plain text codes corresponding to the unique codes on the pair of labels.

The method can further comprise, in some embodiments, generating a batch of unique codes and producing a set of labels including unique codes from the batch, where the set of labels includes the pair of labels and the individual labels. In some of these embodiments, producing the set of labels comprises creating a roll of the labels. Also in some of these embodiments, generating the batch of unique codes includes encrypting plain text codes that are related by a sequence or pattern.

In various embodiments the method further comprises marking at least one of a lot code, a harvest date, or a best before date on at least some of the individual labels. Marking can be performed by printing on the labels either before or after affixing the labels to the produce being harvested. Printing on every label can be achieved with a printer before affixing the labels, or with a date-coding gun after affixing the labels, for example. In various embodiments marking the labels includes marking the lot code and either a harvest date or a best before date, where the combination of the marked lot code and date defines a unique code.

Another exemplary method comprises generating a batch of unique codes, marking a plurality of item-level packages with unique codes from the batch to produce a plurality of marked item-level packages, labeling a box with a unique box code, filling the box with the marked item-level packages, and creating a record that associates the unique box code with the marked item-level packages within the box. Marking the plurality of item-level packages can comprise, in some embodiments, affixing a label to each of the item-level packages, where each label includes a unique code from the batch. Marking the plurality of item-level packages can also comprise printing a unique code from the batch on each item-level package. Labeling the box with the unique box code can include affixing a box label including the unique box code to the box, and in some of these embodiments the box label includes one or more detachable tags, each tag including the same unique box code.

Another exemplary method for associating information with harvested produce comprises receiving a box including a plurality of marked item-level packages, each marked item-level package including a unique code marked thereon, the box further including a label including a unique box code. The method further comprises recording harvest information on a harvest form, packing the marked item-level packages with produce, and creating a record that associates the harvest information with the unique box code. In some embodiments, the label further includes one or more detachable tags, each tag including the same unique box code. Some of these embodiments further comprise detaching a detachable tag from the label and affixing the tag to the harvest form.

Still another exemplary method of the invention comprises marking a plurality of item-level packages with unique codes from a batch of unique codes to produce a plurality of marked and empty item-level packages. The method optionally comprises generating the batch of unique codes or receiving the batch of unique codes from another party. The exemplary method further comprises filling a container with the marked and empty item-level packages, and creating a record that associates the marked and empty item-level packages in the container to each other. In various embodiments, creating the record that associates the marked and empty item-level packages in the container to each other comprises scanning one of the marked and empty item-level packages, such as the first or last marked and empty item-level package placed into the container.

Yet another exemplary method for associating information with harvested produce comprises receiving a container including a plurality of empty item-level packages, each empty item-level package including a unique code marked thereon, and removing the empty item-level packages from the container and packing the marked item-level packages with produce. The exemplary method also comprises recording harvest information, such as on a harvest form or with an electronic hand-held device, and creating a record that associates the harvest information with the unique codes marked on the item-level packages from the container. Associating the harvest information to the associated marked item-level packages comprises scanning one of the marked item-level packages, in some embodiments. In various embodiments an item-level package is further scanned as part of a labor data collection event. Similarly, a plurality of item-level packages can be scanned as part of a quality inspection process, and quality assessments are further associated with the harvest information.

Yet another exemplary method for associating information with harvested produce comprises generating a batch of unique codes with a first computing device, the codes spanning a first range from an initial code to a final code, and storing the batch of unique codes in a database. The method further comprises transmitting the batch of unique codes to a second computing device, such as a label printing device, receiving a first unique code in association with first harvest data from a third computing device, and storing the first harvest data in association with the batch of unique codes in the database. The method can optionally comprise printing a roll of labels, where each label of the roll is sequentially printed with a different unique code from the batch, from the initial label of the roll with the initial unique code to the final label of the roll with the final unique code. In some embodiments, the unique codes are printed on the labels in both a human-readable format and a machine-readable format. Where a roll of labels is used in conjunction with more than one harvest event, the method can also further comprise receiving a second unique code in association with second harvest data from the third computing device, and storing the second harvest data in association with the batch of unique codes in the database. In various embodiments transmitting the batch of unique codes to the second computing device is performed over a first communication channel and/or receiving the first code in association with the first harvest data from the third computing device is performed over a second communication channel.

Yet another exemplary method for associating information with harvested produce comprises receiving a roll of labels, where each label of the roll sequentially includes a unique code from a batch of unique codes, and the unique codes span a range from an initial unique code to a final unique code, and an initial label of the roll includes the initial unique code and a final label of the roll includes the final unique code. The method further comprises associating first harvest data with a first unique code from a label of the roll, affixing labels from the roll to item-level packages or individual items of produce, and transmitting the first unique code in association with the first harvest data. The label with the first unique code may be the initial label, the final label, or any label in between. Associating the first harvest data with the first unique code can include, in various embodiments, reading the first unique code with a hand-held device, or affixing a label from the roll to a harvest form, the label including the first unique code. The method optionally also comprises associating second harvest data with a second unique code from the roll, and transmitting the second unique code in association with the second harvest data.

BRIEF DESCRIPTION OF DRAWINGS

FIG. 1 shows a pre-printed harvest form according to an exemplary embodiment of the present invention.

DETAILED DESCRIPTION OF THE INVENTION

Figure 2:
FIG. 2 shows a pre-printed label according to an exemplary embodiment of the present invention.

The present disclosure is directed to improving the traceability of goods through the supply chain, and in particular, the traceability of produce from the field to the consumer. Traceability of produce back to the growing fields is implemented by marking loose bulk produce, clamshells, bags, boxes, trays, cartons, and other forms of item-level packaging with unique codes. The unique codes can follow a known sequence or pattern, or the unique codes may appear random but are actually the encrypted versions of underlying codes that follow a known sequence or pattern. Marking can be done with labels that have been pre-printed with the unique codes, in some instances. Towards the goal of traceability, the unique codes are further associated with information such as harvest information. A unique code read from an item of produce at a later date can be used to find the previously associated information. It will be appreciated that produce is used herein as an example, but the present invention can equally be applied to other food item, pharmaceuticals, and so forth, where it is important to be able to trace units back to their sources.

In the fields where produce is harvested, data entry is not a particularly convenient task. Accordingly, in some embodiments harvest forms and rolls of labels are provided, where the unique codes on the labels follow the sequence or pattern. The labels are removed from the rolls and applied to the loose bulk produce or item-level packaging, and harvest information is also recorded on the harvest form. Before any items are labeled, however, the first label from each roll in use is removed and placed on the harvest form. When the roll is no longer being used, for example, because of a harvesting crew change, one final label is removed from the roll and placed on the harvest form next to the first label from that roll. Further embodiments do not require the application of the final label to the harvest form. In still further embodiments, data entry is performed through a hand-held device, instead of being recorded on a harvest form, and the same hand-held device is used to read unique codes from labels.

In other embodiments, empty item-level packaging is marked with the unique codes, either by printing, scribing, or with labels, as above. In these embodiments, a box filled with these marked item-level packaging is brought to the field and a harvest form is completed. The box, in these embodiments, includes a label with a unique box code, and in some further embodiments the label also includes one or more detachable tags, where each of the tags also includes the same unique box code. The unique codes marked on the item-level packaging are associated with the unique box code. When the marked item-level packaging from the box are filled with produce, the unique box code is noted on the harvest form, for example, by detaching a tag from the label on the box and affixed the tag to the harvest form.

Harvest forms are then brought to a data entry location, such as an office, where the information from the harvest forms is used to create electronic records that are stored in a database, for example. In those embodiments that affix pairs of first and last labels to the harvest forms, the unique codes for each pair, or the corresponding underlying decrypted codes, are associated with the information from the harvest form. In those embodiments that employ the unique box code, the unique box code is associated with the information from the harvest form. The unique box code provides a link between the records that associate the unique box code with a range of unique codes on item-level packaging and the further records that associate the unique box code with information from the harvest form. It will be appreciated that performing the data entry in a centralized location provides several advantages. For example, less infrastructure is required, and in particular, fewer scanners. Those scanners, in turn, are not subjected to harsh field conditions that tend to cause scanners to have to be replaced prematurely. Centralized data entry, and the methods described herein generally, have little impact on the workflow in the fields.

Figure 1:
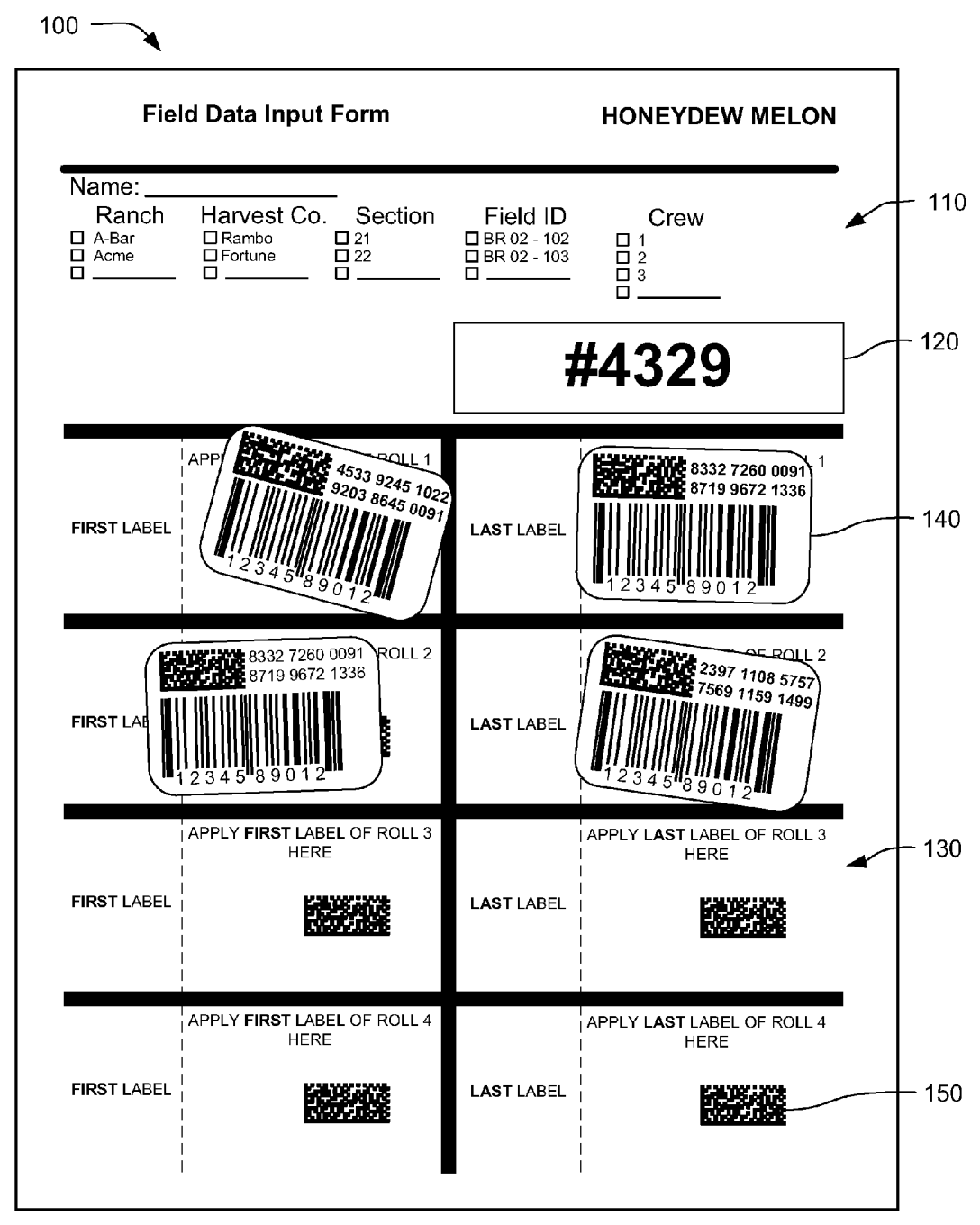

FIG. 1 shows a pre-printed harvest form 100 according to an exemplary embodiment of the present invention. The harvest form 100 provides a convenient way to record information in the fields and includes spaces to place labels used for marking individual items of produce, or item-level packaging such as bags, clamshells, cartons, baskets, and so forth. The harvest form 100 can include various types of information. For example, the harvest form 100 can include information that does not vary from one harvest to another, such as the type of produce—honeydew melon in the exemplary harvest form 100. Information of this type can be pre-printed on the harvest form 100, in some embodiments.

The harvest form 100 also can include a region 110 for recording information such as the harvest event data for the particular harvest. Additionally, each harvest form 100 includes a unique harvest form code 120 that is different for each harvest form 100, in some embodiments. The unique harvest form code 120 can also be pre-printed on the harvest form 100, in some embodiments. The unique harvest form code 120 can also be stamped on, or otherwise applied to the harvest form 100, at the time of harvesting. In some embodiments, the unique harvest form code 120 is provided in a human-readable format, as shown, or a machine-readable format, or both. The unique harvest form code 120 can also be stamped or applied to the harvest form 100 at the time of harvesting.

The harvest form 100 further includes one or more rows 130, where each row 130 is intended to receive a pair of labels 140. The labels 140 are described in greater detail with respect to FIG. 2, below. In some embodiments of the harvest form 100, the spaces provided in the rows 130 for the labels 140 can each include a pre-printed dummy code 150 that is intended to be covered by the labels 140, but if not covered can be read to show that a label 140 was missing from the space.

FIG. 2 shows the pre-printed label 140 of FIG. 1 according to an exemplary embodiment of the present invention. Each label 140 includes a unique code that can be represented in a human-readable form 210, in a machine-readable form 220, or both. In one embodiment, the unique code in the human-readable form 210 comprises a 24 digit number. The unique code in the machine-readable form 220 can comprise a data matrix, as shown, or a GS1 databar code, for example. Each label 140 may also include a UPC code 230 corresponding to the produce to be harvested. In some embodiments, the unique code in the machine-readable form 220 can comprise both the UPC code 230 and the unique code. Labels 140 can be provided on rolls or sheets, for example. Further detail regarding the use of the labels 140 and the unique codes are provided below with respect to FIG. 3.

Figure 3:
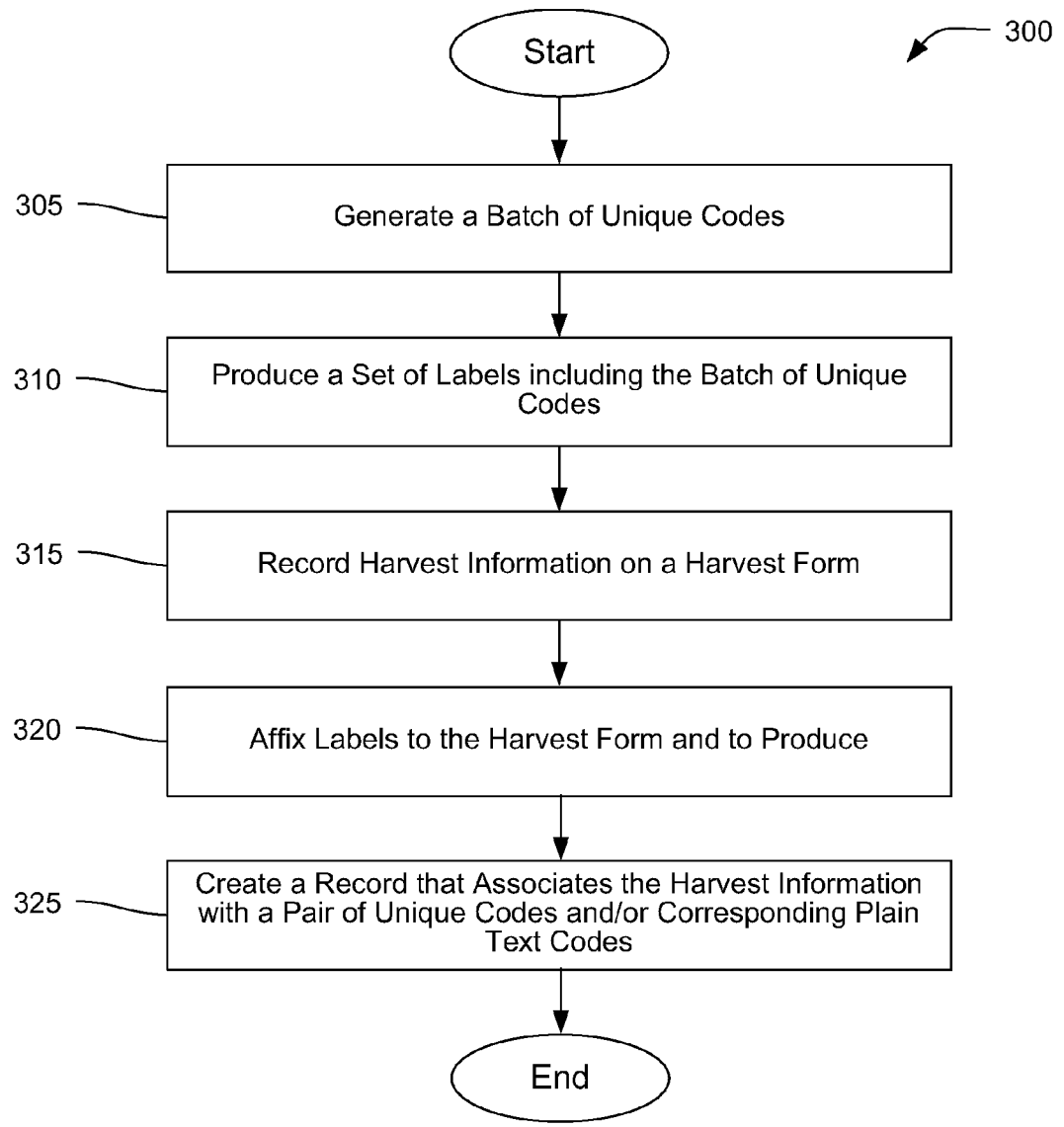
FIG. 3 provides a flowchart representation of a method 300 for associating information with harvested produce according to an exemplary embodiment of the present invention.

FIG. 3 provides a flowchart representation of a method 300 for associating information with harvested produce according to an exemplary embodiment of the present invention. The method 300 comprises a step 305 of generating a batch of unique codes and a step 310 of producing a plurality of labels 140 including the unique codes generated in step 305. The method 300 also comprises a step 315 of recording harvest information on a harvest form 100, a step 320 of affixing labels 140 to both the harvest form 100 and to produce being harvested, and a step 325 of associating harvest information with unique codes in a searchable database.

In various embodiments, steps 305 and 310 are performed by a first party that supplies labels 140 and harvest forms 100, while steps 315, 320, and 325 are performed by a second party, such as a produce grower or packer, which receives the labels 140 and the harvest forms 100 from the first party. In some of these embodiments, the labels 140 and harvest forms 100 are custom made for the second party upon request. Also in some embodiments, the first party produces the harvest forms 100 and/or the labels 140 at the work site of the second party through a secure computing system. In still other embodiments, each of the steps 305-325 of the method 300 are performed by the same party. It is noted steps 315 and 320 can occur in either order or can be performed together.

Step 305 of the method 300 comprises generating one or more batches of unique codes. A batch of unique codes is a plurality of codes that follow a sequence or pattern, or a plurality of codes that are the encryptions of other codes that follow a sequence or pattern. For clarity, in those embodiments in which the unique codes comprise the encryptions of other codes, the codes that are related to one another and that are encrypted are referred to herein as plain text codes while the encryptions thereof may be referred to herein as either unique codes or cipher text codes. An exemplary batch of unique codes can comprise, for example, a sequence of serial numbers that have been encrypted. Methods for generating plain text codes and for generating unique codes therefrom are described in detail in related U.S. patent application Ser. No. 11/619,747 noted above.

It is noted that generating unique codes that are cipher texts and that include large numbers of digits provides certain advantages. Where the number of digits is 12, for example, the total possible number of unique codes is 10 to the power of 12, thus, the total number of unique codes ever in use will be a small fraction of the total possible number of unique codes. It is therefore unlikely that a person would be able to guess a valid unique code. The unpredictability of the unique codes can be important for vendor promotions, for example, when there is a valuable benefit, such as a coupon, provided when a customer submits a valid unique code or is reimbursed for poor product quality or a recalled product. If the unique code was predictable, customers could attempt to defraud the system by guessing codes for units of produce that they had not purchased and obtain the coupons. Furthermore, when the set of valid unique identifiers comprises a small fraction of the total possible number of unique codes, it is much less likely that someone will submit an unintended, yet valid unique code by mistyping a valid unique code.

In various embodiments, the number of unique codes in a batch is dictated by the needs of the grower or packer. For instance, a batch can include a larger number of unique codes to accommodate a large lot size, or a small number of unique codes to accommodate a small lot size. In some instances, step 305 includes receiving a request for a batch size, for example, a request for a batch of 1,000. The request can come from a produce grower or packer, for instance. It will be appreciated that tailoring batch size to lot size can be convenient in some instances, but that there is no requirement that they be the same. Accordingly, the batch size can be much greater or smaller than the lot size.

Step 310 comprises producing a plurality of labels 140 where each label 140 includes one of the unique codes from the batch generated in step 305. The plurality of labels 140 produced in step 310 can comprise one or more rolls of labels 140 or a number of sheets of labels 140, for example. On a roll of labels 140, the unique codes on successive labels 140 either follow a sequence or pattern or are the cipher texts of plain text codes that follow the sequence or pattern. In the latter instance, the unique codes on successive labels 140 on a roll will appear to be random, but when decrypted will result in plain text codes that follow the sequence or pattern. The same can be applied to the unique codes of successive labels 140 on sheets of labels 140.

Step 315 comprises recording harvest information on a harvest form 100. The harvest information can be recorded by a harvest supervisor, for instance. Harvest information can include, for example, the ranch or farm, the field and section harvested, the crew harvesting the produce, the harvest time and date, the weather conditions, the lot number, type of produce harvested, brand name, seed variety, special notes, and so forth. As provided above, some of this information may not vary and can be pre-printed on the harvest form 100.

Step 320 of method 300 comprises affixing labels 140 to both the harvest form 100 and to produce being harvested. Here, "produce being harvested" refers to either loose bulk produce or item-level packaging filled with produce. In some embodiments, field workers are provided with rolls of labels 140. Each time a roll of labels 140 is used by a field worker, the field worker peels a first label 140 off of the roll and affixes that label 140 to a row 130 of the harvest form 100. In the exemplary harvest form 100, the first label 140 is placed in the left column of the harvest form 100. The field worker then affixes successive labels 140 from the roll or sheet to produce being harvested. Each loose bulk produce item or item-level packaging of produce receives one label 140 in step 320.

When the field worker reaches the end of a roll, the field worker takes the final label 140 of the finished roll and affixes that last label 140 to the same row 130 of the harvest form 100, such as the right column in the illustrated example. Similarly, if the field worker has finished packing produce in the harvest associated with the particular harvest form 100 but still has a partially used roll, the field worker takes the next unused label 140 from the partially used roll, and affixes that label 140 to the same row 130 of the harvest form 100. Where the roll is only partially used, the same roll can be used again with the same harvest form 100 or with a different harvest form 100. Where a field worker finishes a roll before completing the harvest associated with the harvest form 100, the field worker can continue with a new or a partially used roll, again by affixing a first label 140 to the harvest form 100, affixing successive labels 140 to produce being harvested, and then affixing a last label 140 to the harvest form 100. It will be appreciated that method 300 does not require the same person to perform all of the tasks of the step 320. For instance, a field supervisor can affix the first labels 140 to the harvest form 100 before providing the rolls to the field workers.

Step 325 comprises creating a record that associates the harvest information recorded on the harvest form 100 with one or more pairs of unique codes and/or any plain text codes that correspond to the unique code pairs. The record can be created with logic, such as a database application, and stored in a searchable database, for example. Creating the record can include, in some embodiments, manually entering the harvest information through a graphical user interface. In some other embodiments, creating the record can include automatically entering the harvest information with a reader configured to read the harvest form 100, such as by recognizing marked checkboxes, decoding barcodes, or performing optical character recognition, for example. In some embodiments, step 325 also comprises associating the unique harvest form code 120 with the created record.

Figure 4:
FIG. 4 illustrates a graphical user interface for entering harvest information, according to an exemplary embodiment of the present invention.

FIG. 4 illustrates a graphical user interface 400 for entering harvest information, according to an exemplary embodiment of the present invention. The graphical user interface 400 can comprise a web page viewed with a web browser on the display of a personal computer, for instance. In some embodiments, the web page is served by a remote server and the record created in step 325 is created and stored remotely. In some of these embodiments, a party other than the grower or harvester maintains the created records as a service. The remote server can be a host in a host-client relationship with a client computing system used to enter the harvest data.

It can be seen in the exemplary graphical user interface 400 that the harvest information can be automatically entered by reading the harvest form 100, as previously noted. It can also be seen that the graphical user interface 400 allows a user to manually enter missing data, or correct erroneous data. In various embodiments, pairs of unique codes on the harvest form 100 are manually entered through a graphical user interface or automatically entered with a fixed or handheld scanner such as a barcode reader, for instance. The exemplary graphical user interface 400 of FIG. 4 shows pairs of unique codes that were entered automatically. In some embodiments of the graphical user interface 400, unique codes that were erroneous entered can be selected and removed.

In some embodiments, the unique codes are cipher texts of plain text codes, as illustrated in FIG. 4, and in these embodiments step 325 can further comprise decrypting the unique codes and associating the resulting plain text codes with the record. The further step of decrypting the unique codes and associating the resulting plain text codes with the record can be performed at the time the record is created or at some later time. For example, in some embodiments the record associating the harvest information and the pairs of unique codes is created locally, then the record is communicated to a remote computing system, such as the remote web server mentioned above, that is configured to perform the decryption, save the plain text codes to the record, and save the record in a searchable database. In some embodiments of the method 300, records created in step 325 only associate the plain text codes with the harvest information, and do not retain the unique codes themselves. In either case, given a unique code, the corresponding harvest information can be readily determined from the records.

Figure 5:
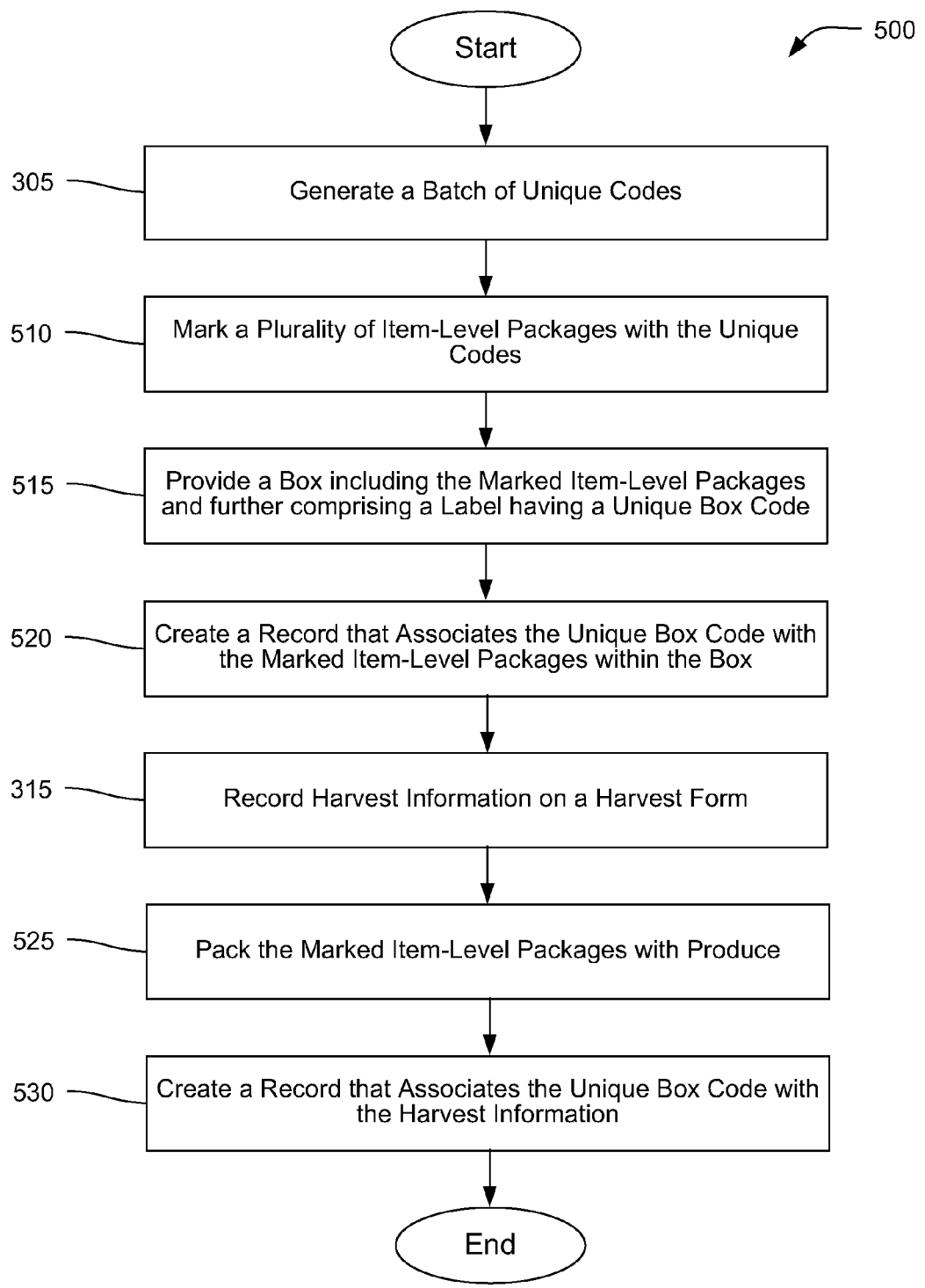
FIG. 5 provides a flowchart representation of a method for associating information with harvested produce according to an exemplary embodiment of the present invention.

FIG. 5 provides a flowchart representation of a method 500 for associating information with harvested produce according to an exemplary embodiment of the present invention. The method 500 comprises the step 305 (FIG. 3) of generating a batch of unique codes and a step 510 of marking a plurality of item-level packages with the unique codes. The method 500 further comprises a step 515 of providing a box packed with the marked item-level packages and further comprising a unique box code. The method 500 also comprises a step 520 of creating a record that associates the unique box code with the marked item-level packages within the box. In some embodiments, the steps just described are performed by a first party that supplies item-level packaging, while the following steps of the method 500 are performed by a second party such as a grower or harvester. Accordingly, method 500 also comprise a step 315 (FIG. 3) of recording harvest information on a harvest form 100, a step 525 of packing the marked item-level packages with produce, and a step 530 of creating a record that associates the unique box code with the harvest information. Steps 305 and 315 in the method 500 can both be performed as described above with respect to FIG. 3. Steps 515 and 520 can be performed in either order or together, in various embodiments.

Step 510 comprises marking a plurality of item-level packages with the unique codes generated in step 305 to produce a plurality of marked item-level packages. The item-level packages can comprise bags, clamshells, cartons, baskets, and the like. The item-level packages can be marked with labels such as label 140, or by various printing techniques, or by laser engraving, for example.

Step 515 comprises providing a box including the marked item-level packages and further comprising a unique box code. Here, the unique box code is a unique code assigned to the box and marked on the exterior of the box. The unique box code can be marked with a label that includes the unique box code, or by various printing techniques, or by laser engraving, for example. The unique box code is machine-readable, in some embodiments. Step 515 can include packing the box with some or all of the marked item-level packages produced in step 510. It will be understood that the marked item-level packages produced in step 510 can be distributed across many such boxes so long as the unique codes on the item-level packages within a particular box, or the underlying plain text codes if the unique codes are cipher texts, follow the series or pattern.

Step 520 comprises creating a record that associates the unique box code with the marked item-level packages within the box. The record can be created with logic such as a database application and the record can be stored in a searchable database, for example. Step 520 can comprise entering the unique box code and entering the unique codes from the first and last item-level packages placed in the box. Entering the unique box code can be performed manually through a graphical user interface similar to the graphical user interface 400, or automatically with a fixed or handheld scanner, for instance. Likewise, entering the first and last unique codes from the marked item-level packages can be performed automatically by scanning the unique codes or manually through a graphical user interface. Further disclosure regarding packing boxes with marked item-level packaging can be found in U.S. Provisional Patent Application No. 61/080,121 filed on Jul. 11, 2008 and entitled "Mobile Table for implementing Clamshell-to-Case Association" which is incorporated herein by reference.

In step 520, creating the record that associates the unique box code with the marked item-level packages within the box can comprise, in some embodiments, associating the unique box code with the first and last unique codes marked on the item-level packages in the box. In other embodiments, creating this record comprises associating the unique box code with the plain text codes that correspond to the first and last unique codes marked on the item-level packages.

Step 525 comprises packing the marked item-level packages with produce. Step 525 can be performed manually or through the use of automated packing equipment, for example. The filled item-level packages can then be aggregated into trays or cases for distribution through the supply chain to the retailer.

Step 530 comprises creating a record that associates the unique box code with the harvest information from the harvest form 100 recorded in step 315. The record can be created with logic such as a database application and the record can be stored in a searchable database, for example. As above, the record can be created and stored remotely. While the records created in steps 520 and 530 can be created by different logic and stored in different databases, in various embodiments these records are created by the same logic and/or stored in the same database.

In some embodiments, step 530 includes writing the unique box code on the harvest form 100. Later, the record can be created by manually or automatically entering the harvest information and the unique box code in a manner analogous to that described above with respect to step 325. In further embodiments, the unique box code and the unique harvest form code 120 are both scanned in the field to create a record that associates the two. Later, a record is created with the harvest information by manually or automatically entering the harvest information in a manner analogous to that described above with respect to step 325, and the unique harvest form code 120 is used to find the associated unique box code so that the unique box code can be associated with the record of the harvest information.

Figure 6:
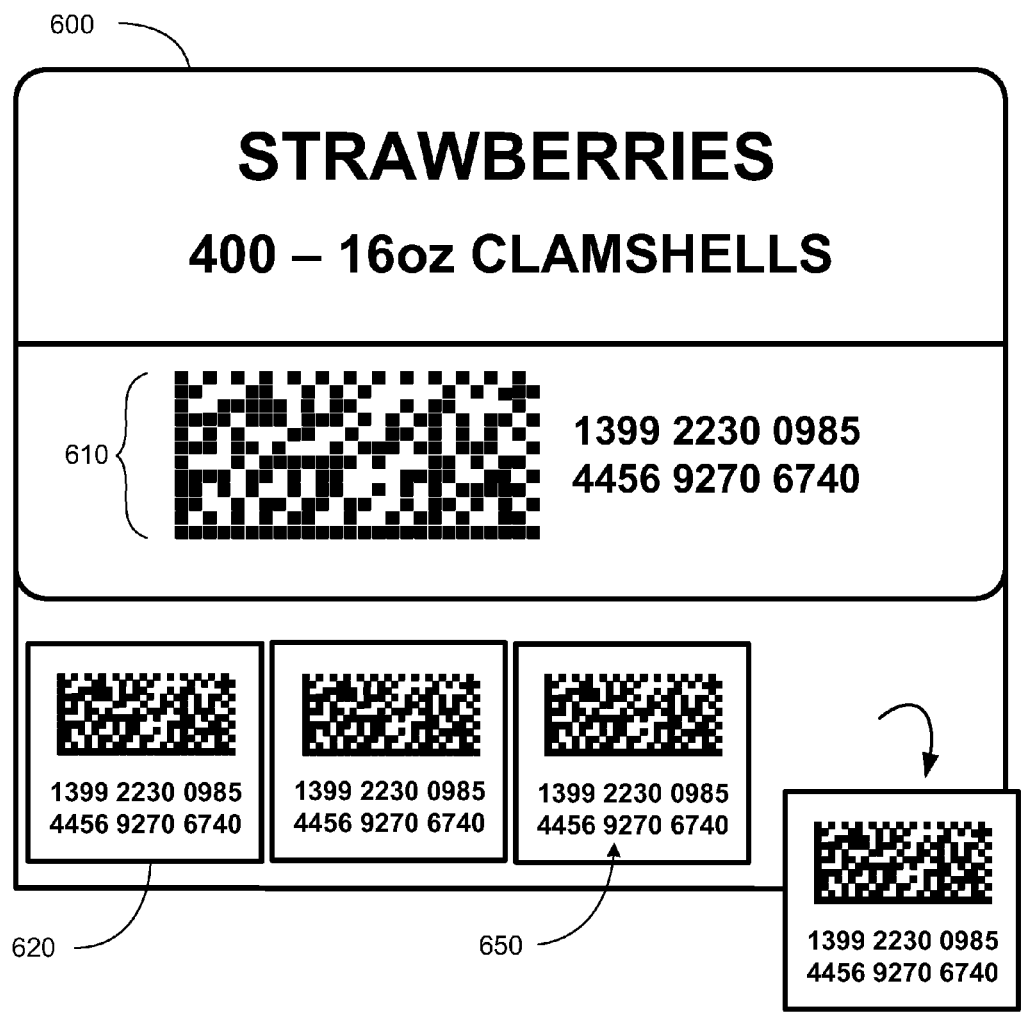
FIG. 6 shows a pre-printed box label according to an exemplary embodiment of the present invention.

FIG. 6 shows a pre-printed box label 600 according to an exemplary embodiment of the present invention. The box label 600 facilitates the association of unique box codes with harvest information in some embodiments, as described below with reference to FIG. 7. The box label 600 can include an adhesive backing and comprises several fields of information including the unique box code 610, which in the illustrated embodiment is presented in both human-readable and machine-readable forms, though either one of these formats can be sufficient. The box label 600 also comprises one or more detachable tags 620 that also each comprise the unique box code 610. The detachable tags 620 can be adhesive-backed, in some embodiments. In the illustrated embodiment, the detachable tags 620 can be peeled off of the box label 600, while in other embodiments the detachable tags 620 can be separated from the box label 600 along perforations, for example. It will be appreciated that an exemplary box label for the method 500 of FIG. 5 would be box label 600 without the detachable tags 620. In some of those embodiments, the box label can be printed or laser engraved directly onto boxes.

Figure 7:
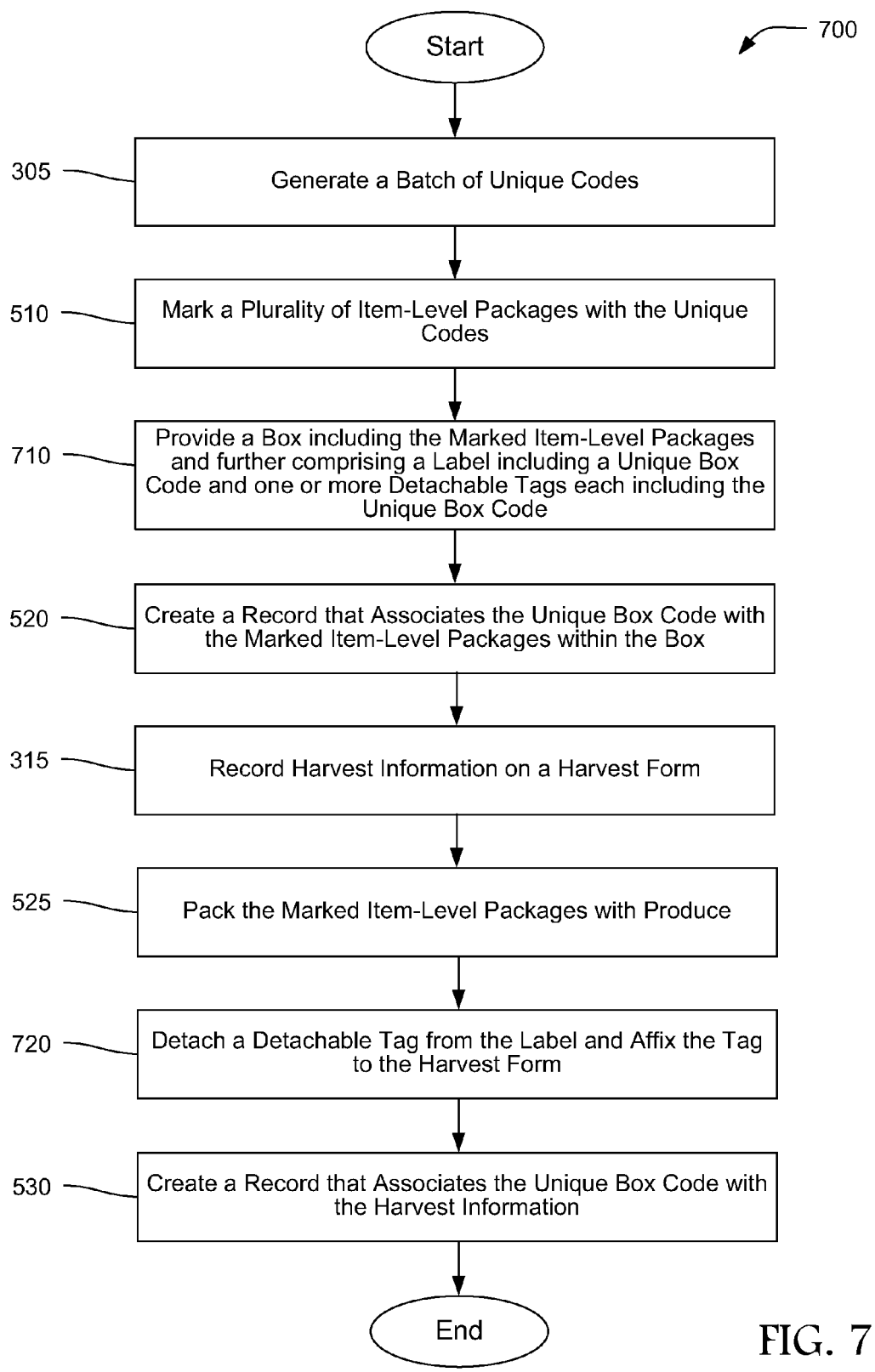
FIG. 7 provides a flowchart representation of another method for associating information with harvested produce according to an exemplary embodiment of the present invention.

FIG. 7 provides a flowchart representation of another method 700 for associating information with harvested produce according to an exemplary embodiment of the present invention. The method 700 differs from the method 500 in that method 700 is specifically directed to those embodiments in which the box label 600 includes the detachable tags 620. Accordingly, method 700 includes a step 710, in place of step 515, in which a box is provided including the marked item-level packages and further comprising a label 600 including a unique box code and one or more detachable tags 620 each including the unique box code. Additionally, the method 700 includes the additional step 720 comprising detaching a detachable tag 620 from the label 600 and affixing the tag 620 to the harvest form 600.

After step 720, the step 530 comprises creating a record that associates the unique box code with the harvest information by manually or automatically entering the harvest information from the harvest form 100 and the unique box code from the tag 620 on the harvest form 100, essentially as described above with respect to the method 500.

It will be appreciated that according to the method 700, multiple harvest forms 100 can include tags 620 with same unique box code leading to the creation of multiple records in step 530 in which potentially different harvest information becomes associated with the same unique box code. As a result, if the records are searched for a particular unique code, several matching records may be found. This is referred to as over-association, and in some situations over-association is advantageous.

For example, when investigating a food contamination situation, while it may not be possible in these embodiments to know which of the several records found for a particular unique code is the correct record of the harvest for that unique code, it is useful to know that several harvests might be closely related and each harvest is worth further consideration. Additionally, when a consumer requests harvest information for a particular unit of produce, several harvest records may be returned. However, in most instances the several records will be for harvests all within a general vicinity, within a short period of time, and under very similar conditions.

It should be noted that the harvest information records created in methods 300, 500, and 700 can be updated with additional information not provided on the harvest form 100. Weather information is one example, described in greater detail below. Customer satisfaction information, also described in greater detail below, can also be added as it is acquired. Other records, such as those pertaining to chemical and pesticide use on the field, temperature during transportation, and distribution, for example, can be linked to the harvest information records, as well.

Figure 8:
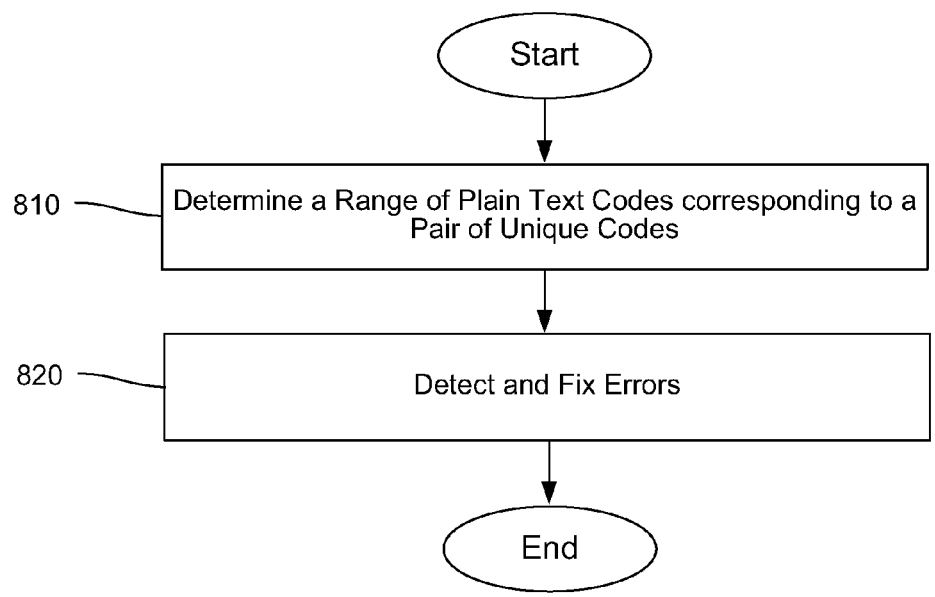
FIG. 8 provides a flowchart representation of optional steps that can be included in either of the exemplary methods provided with respect to FIGS. 5 and 7, according to exemplary embodiments of the present invention.

FIG. 8 provides a flowchart representation of optional steps that can be included in any of the exemplary methods 300, 500, 700 provided with respect to FIGS. 3, 5, and 7, according to exemplary embodiments of the present invention. More specifically, the steps described with reference to FIG. 8 can be sub-steps of the step 530 in both methods 500, 700 or of the step 325 in method 300.

In a step 810, a range of plain text codes corresponding to a pair of unique codes is determined. For example, each of the pair of unique codes is decrypted. The decryption can be performed by the same logic that creates and stores the records, and contemporaneously with creating and storing the records, in some embodiments. In other embodiments, the pair of unique codes is decrypted by different logic, potentially of a different computing system, potentially at a later time, and potentially at a remote location. For instance, a record can be created by a computing system at a field office and then communicated to a more centralized office, such as a corporate office or to a second party that provides product traceability services. These later embodiments offer the advantage of tighter control over decryption keys and also centralized record-keeping. In some instances, the range of plain text codes excludes those plain text codes that are associated with the pair of unique codes from the first and last labels affixed to the harvest form 100 and not affixed to produce.

In a step 820, errors are detected and fixed. One way in which errors can be detected is by comparing the ranges between the pairs of unique codes, or between the corresponding plain text codes, to the number of labels 140 on the rolls. For instance, the size of the rolls can be selected so that in most instances the field workers will completely use each roll during a harvest. For a particular type of produce, for example, each roll may comprise 1000 labels. In this case, the first and last unique code in a row 130 on the harvest form 100 will most commonly be the first and last labels of the roll. When first and last unique codes span a range of exactly 1000 labels 140, there is a high degree of confidence that the record is accurate.

One error that is readily detected and corrected is where the first and last labels 140 for a particular roll have been transposed. Here, the range of the unique codes, or of the plain text codes, will be backwards. If the absolute value of the range equals, or is close to, the number of labels 140 on a roll, then the values can be reversed with a high degree of confidence.

When the range spanned by the first and last unique codes exceeds the number of labels 140 on an entire roll, then it is likely that there is an error wherein the first label came from one roll and the last label 140 improperly came from another roll. In some embodiments, such transposed labels 140 on a harvest form 100 can be readily determined because switching two last labels 140 creates two ranges that each equals the number of labels 140 on the rolls. In situations where transposing labels 140 does not produce two corrected ranges that both equal the number of labels 140 on a roll, then a degree of confidence can be determined for various alternatives and the alternative with the highest degree of confidence can be selected. In some embodiments, finding and correcting errors can consider more than a single harvest to find labels 140 incorrectly placed on the wrong harvest forms 100.

In other embodiments, such errors are not corrected, over-associating unique codes with harvest information. This is done on the theory that it is beneficial to know all the harvest information that may be associated with a unique code and thereby reliably exclude all other harvest information as not being associated with the unique code. In some embodiments, associations of unique codes with a harvest are only removed when the possibility can be positively ruled out. In other cases, only certainty above some lesser confidence threshold is required to rule out such an association.

Other methods of the invention pertain to utilizing the records created in methods 300, 500, and 700. In some embodiments, a unique code is received by a host computing system, for example, through a webpage served by a remote server. The URL for the web site can be printed on the label 140, for instance. The unique code can come from a customer at a kiosk in a supermarket, a customer using a home computer, a retailer, a distributor, a government agency, a grower, or a harvester, for example. The unique code can be entered manually by reading the human-readable form 210, or by scanning the machine-readable form 220 with a barcode scanner, for example. In some cases, the machine-readable form 320 can be imaged using a cell phone camera, or submitted using the Short Messaging Service (SMS) or another mobile phone-based communication service.

In some instances, the type of entity submitting the unique code can be determined from an IP address, a login page, etc. Based on the type of entity, some or all of the harvest data can be made available. For instance, a retail customer would have access to information about the location of the field, but not the names of workers, the date of the harvest, and so forth. All harvest information, on the other hand, would be accessible to an investigator from the FDA.

Upon receiving the unique code, where the unique code comprises a cipher text, the host computing system decrypts the unique code to determine the corresponding plain text code. The records are then searched to find a range of plain text codes that includes the one for the submitted unique code. In some embodiments, the range directly correlates to a record of harvest information. In other embodiments, the range correlates to a record that associates the range with a unique box code. Here, further records are searched to find those records that correlate that unique box code with harvest information.

Once the harvest information has been retrieved, that information can be used to ascertain other information. For example, where the harvest information includes the location of the field and the date and time of the harvest, this information can be used to retrieve weather information at the time of harvest from National Weather Service records. It will be appreciated that such further information need not only be determined upon a particular request, but can be associated with the record of the harvest information at the time the record was created, or any time thereafter. In some embodiments, weather information for an entire growing season can be associated with the harvest records.

Additionally, once the harvest information has been determined for a particular unique code, other information can be determined. For example, a customer can request an estimate of the "food miles" for the produce, an estimate of how far the food travelled to reach the customer. The customer can enter an address or a zip code to establish one end point, the field of the harvest comprises the other end point, and the distance between can be readily estimated. In some embodiments, travel time from the field to the retailer can be provided or estimated, while in other embodiments this is considered proprietary information and not made available to the public.

Also, retailers, distributors, growers, and harvesters, for instance, can collect customer satisfaction information from the customers that submit unique codes. The customer satisfaction information can include information collected from the customer, such as the retailer from which the produce was purchased, the date the produce was purchased and consumed, and a satisfaction rating for the quality of the produce.

The customer satisfaction information can then be correlated with the harvest information for the submitted unique code, such as the field the produce was grown on, the date that the produce was harvested, the retailer that sold the produce, the region that the produce was sold, the time of day the produce was harvested, the weather at the time of harvest, the transit time from harvest to consumption, and other factors that may be related directly or indirectly to customer satisfaction levels. This information can be analyzed by retailers, for example, to identify those growers that yield the greatest customer satisfaction levels, to provide feedback to growers as to the conditions which seem to yield the best results, and to adjust the supply chain to have transit times with better customer satisfaction levels.

In some embodiments, incentives can be provided to encourage customer participation in providing information. For example, promotions, discounts, special offers, and coupons can be offered as incentives.

Figure 9:
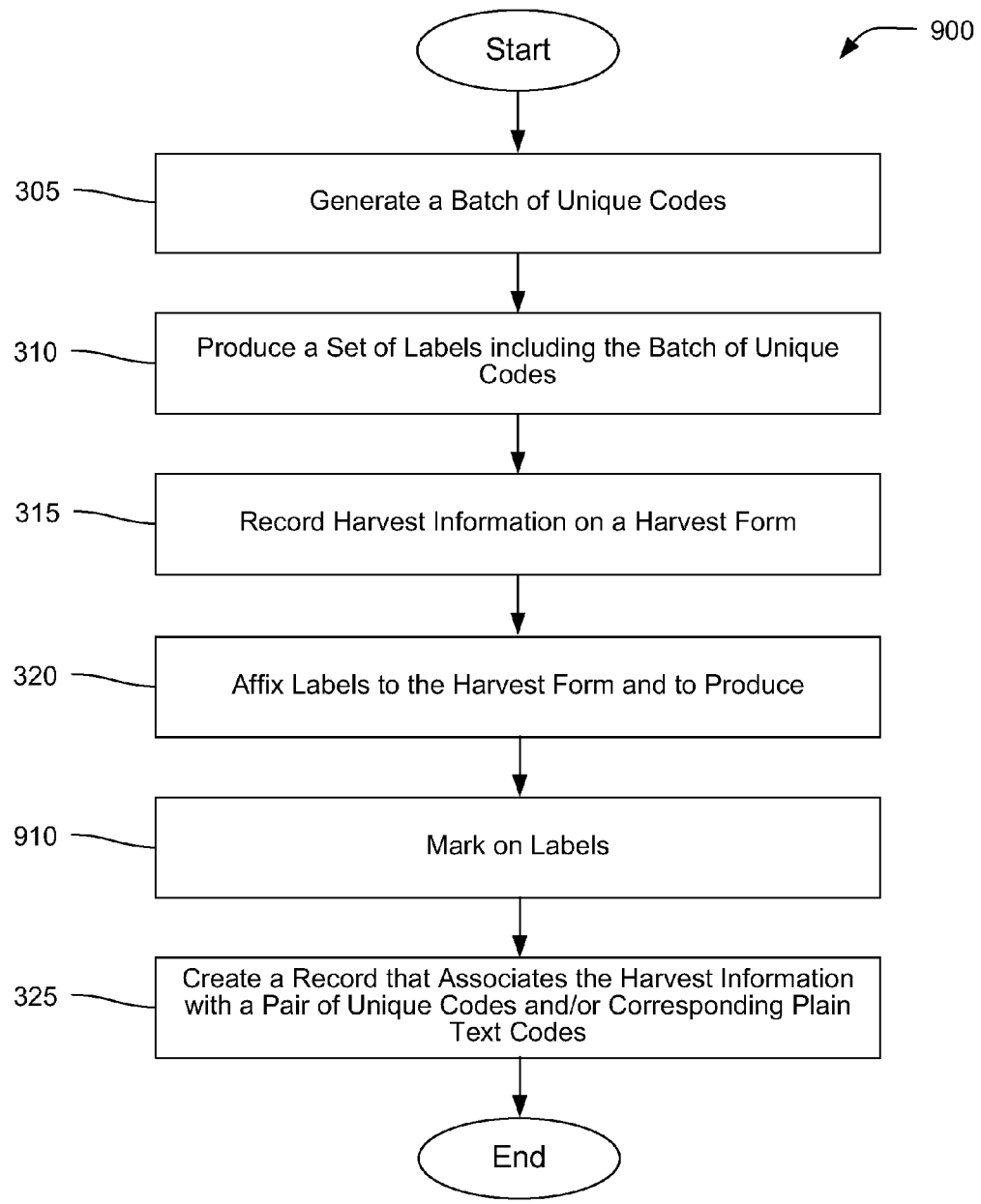
FIG. 9 provides a flowchart representation of a method for associating information with harvested produce according to yet another exemplary embodiment of the present invention.
Figure 10:
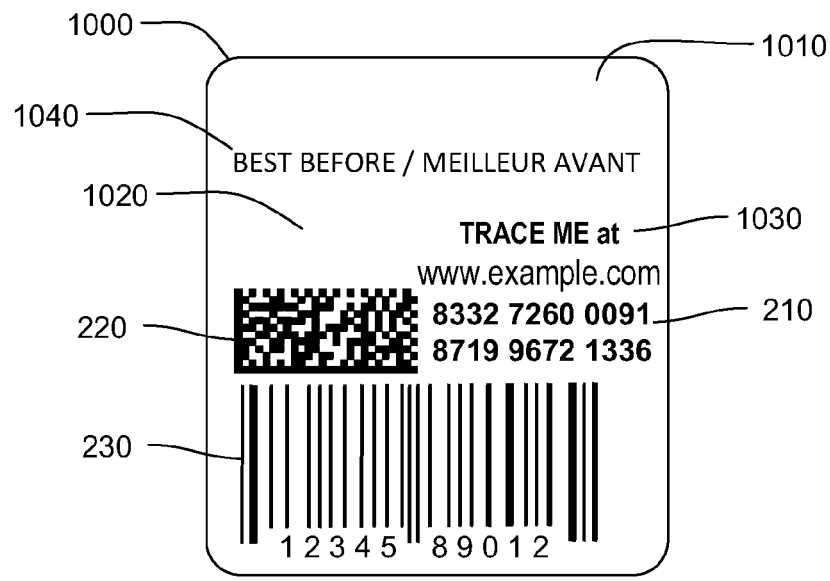
FIG. 10 shows a pre-printed label according to another exemplary embodiment of the present invention.

FIG. 9 provides a flowchart representation of a method 900 for associating information with harvested produce according to still another exemplary embodiment of the present invention. The method 900 adds an additional step 910 of marking on labels to the method 300 (FIG. 3). The labels used in method 900 are similar to the labels 140 but include fields of sufficient size for adding the marking of step 910. An exemplary such label 1000 is shown in FIG. 10.

Label 1000 includes the same information as label 140, namely, a unique code represented in a human-readable form 210 or in a machine-readable form 220, or both, and an optional UPC code 230. Label 1000 also includes blank spaces 1010 and 1020 appropriately sized to later receive additional information. Label 1000 optionally also can include a call to action 1030 and text 1040 that serves to identify at least some of the later-marked information.

Figure 11:
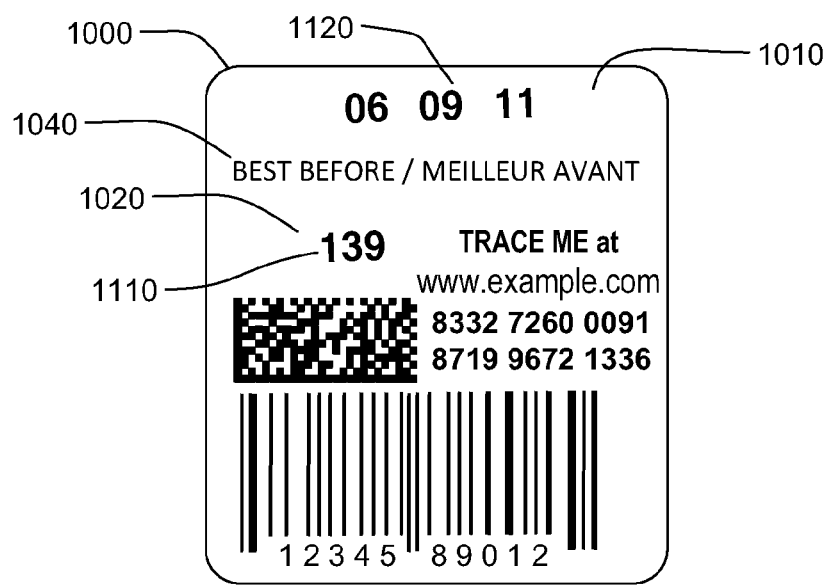
FIG. 11 shows the pre-printed label of FIG. 10 after further marking thereon, according to another exemplary embodiment of the present invention.

In an exemplary step 910, a lot code 1110 and a date such as a best before date 1120 are both marked on the label 1000, as shown in FIG. 11. Here, the text 1040 identifies the marked characters as a best before date. The text 1040 can, in the alternative, indicate a harvest date. Step 910 can comprise marking only one of the lot code 1110, best before date 1120, or harvest date, or any combination thereof. The lot code 1110 can be, for example, a globally unique code, or, as shown in FIG. 11 can be a short code that in combination with a date such as the best before date 1120 or a harvest date is unique. An example of a short code for the lot code 1110 is a ranch ID.

Marking can be accomplished by printing with a printer or with a hand-held date-coding gun, in some embodiments. Marking with a hand-held date-coding gun can be performed after each label 1000 is affixed to the produce in step 320, for example. The same marking is optionally also applied to the labels 1000 after being placed on the harvest form 100, or can be added to the harvest form 100 elsewhere, such as between the labels 1000.

Marking in step 910 can also be accomplished by printing with a printer. In these embodiments a roll of labels 1000 is fed through a printer to add the lot code 1110, best before date 1120, and/or harvest date. The labels 1000, having been marked, are then affixed to the harvest form 100 and to packages of produce in step 320. In still other embodiments a labeling gun holds a roll of labels 1000 and prints the lot code 1110, best before date 1120, and/or harvest date on each label 1000 when the label 1000 is applied to a package.

Figure 12:
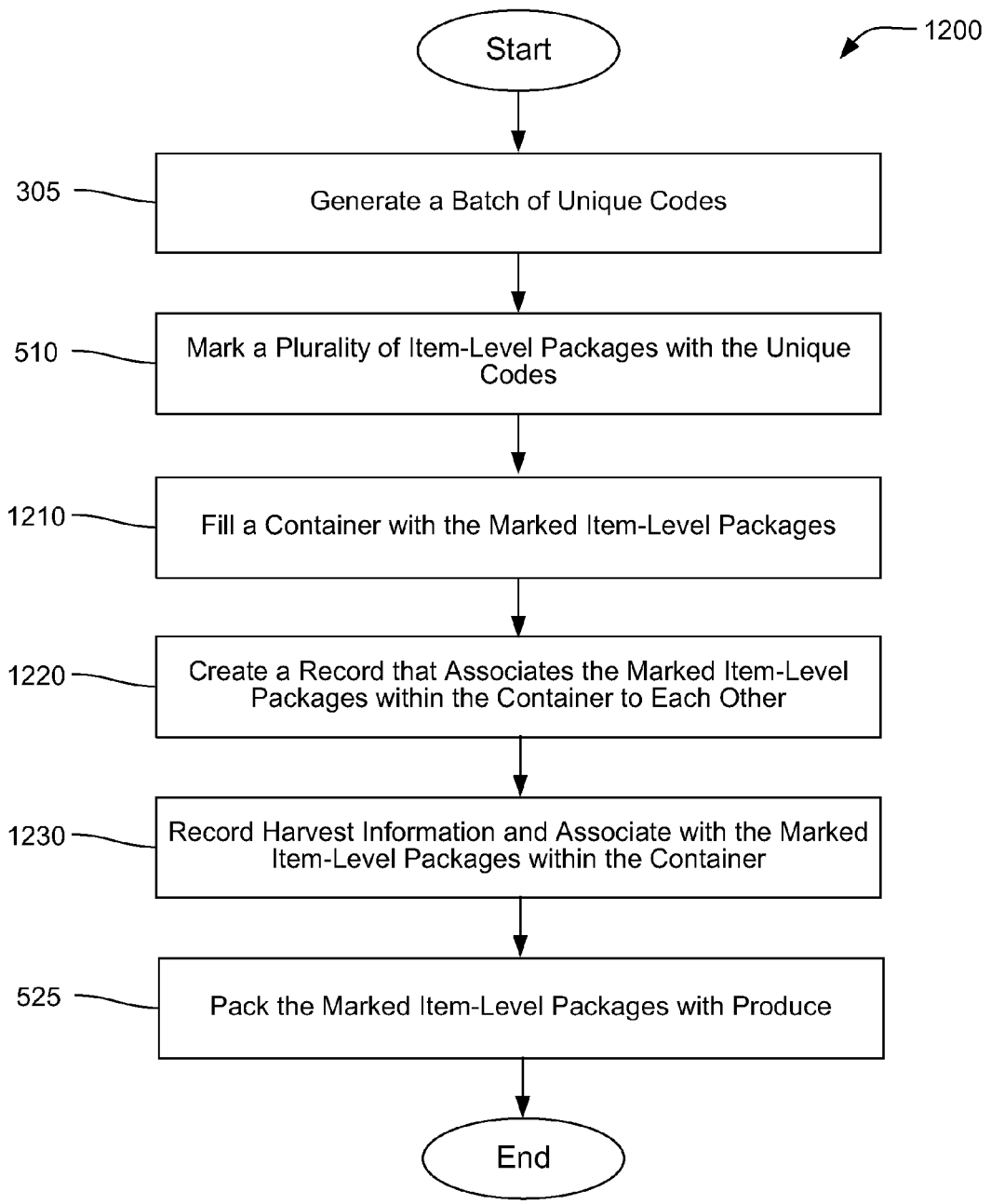
FIG. 12 provides a flowchart representation of a method for associating information with harvested produce according to another exemplary embodiment of the present invention.

FIG. 12 provides a flowchart representation of a method 1200 for associating harvest information with harvested produce according to yet another exemplary embodiment of the present invention. The method 1200 includes steps in common with the method 500 (FIG. 5). Both include, for example, the step 305 of generating a batch of unique codes and the step 510 of marking a plurality of item-level packages with the unique codes. Both methods 500 and 1200 also include the step 525 of packing the item-level packages with produce. In method 500, however, a box code is employed, whereas in method 1200 there is a step 1210 of filling a container with the marked item-level packages and a step 1220 of creating a record that associates the marked item-level packages within the container to each other.

In step 1220, creating the record that associates the marked item-level packages in the container to each other can comprise, for example, associating the marked item-level packages with another unique code such as the box code noted above. In other embodiments, creating the record that associates the marked item-level packages in the container to each other can comprise simply scanning one or more of the marked item-level packages. For example, where the unique codes marked on the item-level packages are sequential, scanning the unique codes of the first and last item-level packages placed in the container serves to define a range of unique codes. As another example, if a specific number of item-level packages are placed in each container and the unique codes marked on the item-level packages are again sequential, then one need only scan, for instance, a first item-level package and that next number of item-level packages can be associated with one another. Even if the number of item-level packages varies from container to container, if one routinely scans the first item-level package, for example, then the scanned item-level package and each item-level package in the sequence thereafter until the next scanned item-level package can be associated together.

Another difference between method 1200 and method 500 is that the step 315 in method 500 records harvest information on a harvest form and then step 530 creates a record that specifically associates the unique box code with the harvest information, while step 1230 of method 1200 comprises recording harvest information and associating the harvest information to the associated marked item-level packages. Thus, while recording harvest information in step 1230 can comprise recording the harvest information on a harvest form, the harvest information can be recorded electronically with one or more hand-held devices, for example.

It will be appreciated, as above, that the steps of marking item-level packages, filling containers with the marked item-level packages, and creating records that associate together the item-level packages within each container are generally performed by a different party than the party that records harvest information, packs the marking item-level packages with produce, and associates the harvest information with the item-level packages from each container. A third party may generate batches of unique codes and supply those codes to the first party, and may receive from the second party and store in a database harvest information associated to ranges of unique codes from the batch. If the third party receives the ranges assigned to each container back from the first party, then the second party only needs to upload the harvest information in association with the scanned unique codes, and the third party can associate the harvest information to the appropriate ranges of codes. Alternatively, the first party can provide the ranges of codes in each container to the second party when providing those containers of empty item-level packaging. In these embodiments, the second party associates the ranges with harvest information and uploads the same to the third party.

Other associations can be made to each associated set of marked item-level packages. In the above example, a unique code on an item-level package can be scanned by the second party as part of a labor data collection event to associate an individual or a crew to a number of item-level packages. The labor data can then be assigned to the harvest information. As another example, a random plurality of item-level packages can be scanned as part of a quality inspection process some time after distribution. This step can be performed by fourth parties along the distribution chain such as distribution centers, warehouses, and retail stores. The time and location of the scanning event, as well as any quality assessments made, can be further associated to the harvest information.

Figure 13:
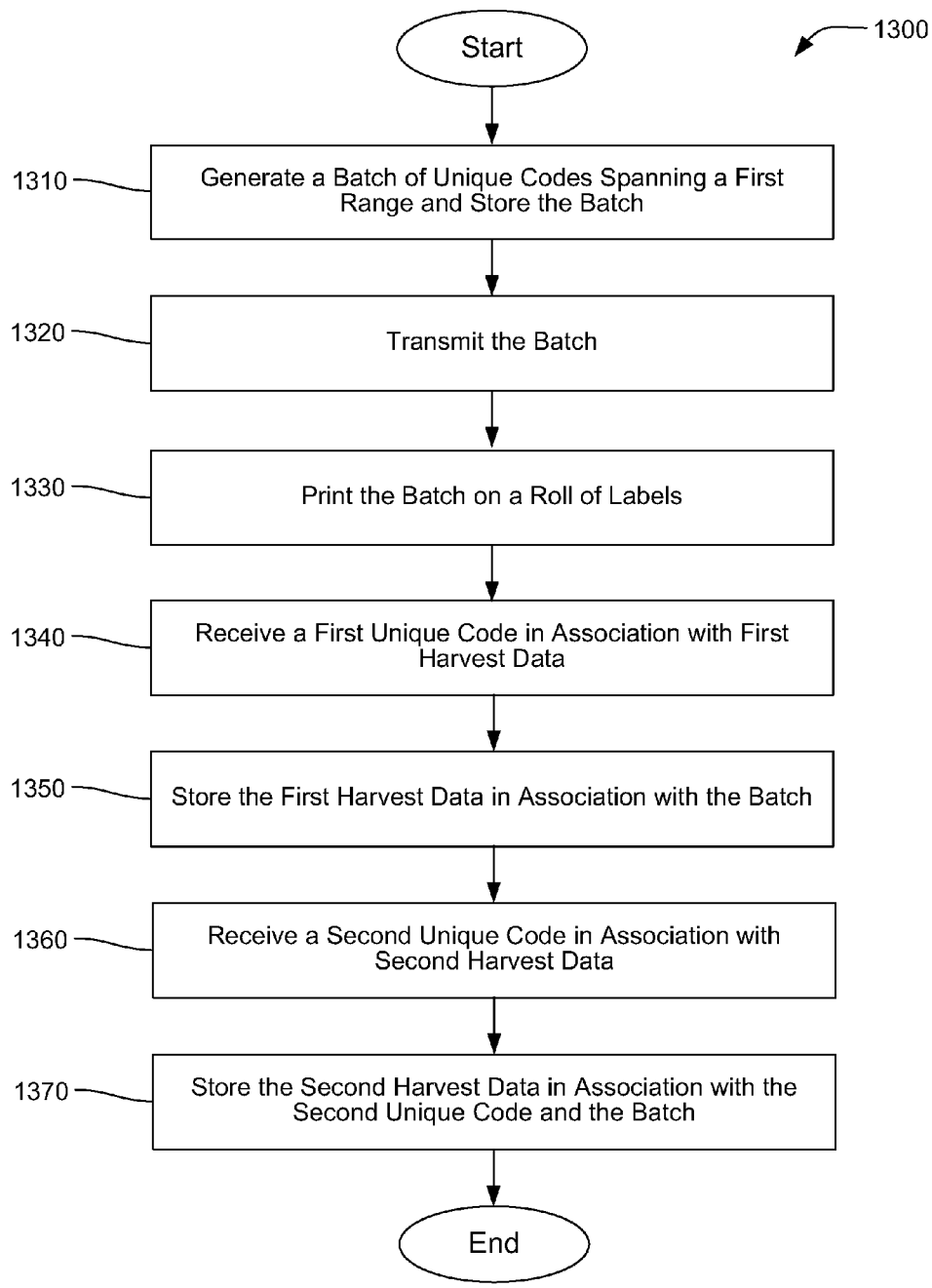
FIG. 13 provides a flowchart representation of a method for associating information with harvested produce according to another exemplary embodiment of the present invention.

FIG. 13 provides a flowchart representation of a method 1300 for associating information with harvested produce according to still another exemplary embodiment of the present invention. The method 1300 comprises a step 1310 of generating a batch of unique codes and storing the batch, a step 1320 of transmitting the batch, an optional step 1330 of printing the batch on a roll of labels, a step 1340 of receiving a first unique code in association with first harvest data, and a step 1350 of storing the first harvest data in association with the batch. The method 1300 optionally also comprises a step 1360 of receiving a second unique code in association with second harvest data, and a step 1370 of storing the second harvest data in association with the second unique code and the batch. As above, this method can be performed by a third party that generates batches of unique codes and supplies those batches to a first party that supplies labels printed with the unique codes to second party harvesters; the third party then receives harvest information associated to unique codes from the second parties. In the alternative, the third party can both generate the batches and print the labels, combining the functions of the first and third parties. Both alternatives are discussed below.

Step 1310 in FIG. 13 comprises generating a batch of unique codes with a first computing device, the codes spanning a first range from an initial code to a final code, and storing the batch. Methods of generating batches of unique codes, including generating sequences of plain text codes and encrypting those plain text codes, have been described previously herein. Thus, a batch of unique codes can comprise a sequence of plain text codes or the encryptions thereof, in various embodiments. Where the batch of unique codes comprises a sequence of plain text codes, the batch spans a first range from an initial code of the sequence to a final code of the sequence and the range has a length defined by the difference. The length of the sequence, as described below, is equal to the number of labels on a roll of labels. A batch of unique codes can also comprise the encryptions of a sequence of plain text codes. In these embodiments, the batch spans a first range from an initial code, being the encryption of the initial plain text code of the sequence, to a final code, being the encryption of the final plain text code of the sequence, and the range has a length defined by the difference between the final and initial plain text codes.

Step 1310 comprises generating the batch of unique codes with a first computing device, such as a server or personal computer. The batch of unique codes, once generated, is then stored in a database in communication with the first computing device. Where the batch of unique codes comprises a sequence of plain text codes, storing the batch can comprise storing the initial and final plain text codes, or the initial or final plain text code in conjunction with the length of the sequence, for instance. Where the batch of unique codes comprises the encryptions of a sequence of plain text codes, storing the batch can comprise storing the encryption of each unique plain text code of the sequence, or, since the encryption algorithm is known, storing the batch can also comprise storing the initial and final plain text codes, or the initial plain text code in conjunction with the length of the sequence.

Step 1320 in FIG. 13 comprises transmitting the batch of unique codes to a second computing device. As noted, this can comprise sending the batch from the third party to a first party that supplies harvesters with harvesting supplies like printed labels. In these embodiments, transmitting the batch can comprise any known secure method for data transmission including those employing the Internet and telephonic systems, as well as writing to a portable storage medium like a compact disk and sending the storage medium by courier. In other embodiments the first computing device may simply transmit the batch in step 1320 to a local second computing device over a local area network (LAN), for example. In either instance the second computing device can be a label printing device or a computing device that controls a label printing device. Transmitting the batch can comprise transmitting each unique code thereof, such as when the unique codes are encryptions of plain text codes, or transmitting the initial plain text code and final plain text code, in various embodiments. Transmitting the batch can also comprise transmitting just the initial plain text code where the number of labels per roll is fixed, for example, and the second computing system is configured to print sequentially starting with the initial plain text code.

Step 1330 in FIG. 13 comprises the optional step of printing a roll of labels, where each label of the roll is sequentially printed with a different unique code from the batch. The initial label of the roll, being the first label a person would remove from the roll, is printed with the initial unique code of the batch, and each label thereafter is printed with the next sequential unique code until the final label of the roll receives the final unique code of the batch. In some instances, the printing process itself begins with the final label and increments to the initial label.

Step 1340 comprises receiving a first unique code in association with first harvest data from a third computing device. As noted, the third computing device can be that of a harvester that has used a roll of labels while harvesting produce, for example. Corresponding methods of the harvester are discussed below, with respect to FIG. 14. The first unique code and the first harvest data can be received over a second communication channel, such as those noted regarding the first communication channel. Where the same party generates the batch in step 1310 and performs a method according to FIG. 14, the second communication channel could be a LAN. In some embodiments, the harvest data that is received comprises a link or pointer to a database entry of such information, rather than the information itself.

Step 1350 comprises storing the first harvest data in association with the batch of unique codes. This can comprise, for instance, creating a record in a database or adding to the existing record for the batch of unique codes that was established in step 1310. In either event, step 1350 includes searching that latter database to determine which range of unique codes, and thus which batch, the received first unique code belongs. This can include the step of decrypting the first unique code in those instances where the unique codes are encryptions of plain text codes. Storing harvest data in association with the batch of unique codes can be accomplished by storing a link or pointer in a field of the database record for the batch, or by including sufficient individual fields for such data in each database record. The received first unique code can also be stored in association with the first harvest data and the batch in step 1350.

In some instances, the first unique code is the initial unique code from a roll, such as when an unused roll is first used, and the initial label is removed and applied to a harvest form (see FIGS. 5 and 6). In other instances the first unique code is some subsequent unique code from the batch. In either situation the assumption is made that the entire roll of labels was used in association with the received harvest event data, and one label at random was selected from the roll to make the association. This can happen, where, for example, a hand-held device is used to read unique codes from labels that have been applied to produce or unit packages.

It will be appreciated that in embodiments where a hand-held device is employed to make associations between unique codes and harvest data (see FIG. 14), step 1340 may comprise receiving multiple instances of unique codes each paired with the same first harvest data, and step 1350 can include storing each such unique code in association with the first harvest event data and batch. In some of these embodiments, each instance of a pairing of a unique code and harvest data received in step 1340 also is received with a time stamp and or a location representing the time and/or place where the pairing was made.

Step 1360 comprises receiving a second unique code in association with second harvest data from the third computing device, as in step 1340. Step 1370 comprises storing the second harvest data in association with the second unique code and the batch, as in step 1350.

Pairings of harvest data with unique codes from labels on the same roll, and hence the same batch, may be received in any order, as for example, if rolls of labels are unwound, torn into long strips, and distributed to pickers heading into different fields or blocks. Also, where labels are applied to harvest forms, as discussed with respect to FIGS. 14-16, the harvest forms can be later read and the information uploaded in non-sequential order.

Furthermore, more than one set of harvest data can be associated with one batch, such as when strips from a roll are distributed or a partially used roll is used in a different harvest event, in which case the result is over-association, noted earlier. Additionally, an inference can be made that any unique code in the sequence of a batch that follows a received unique code associated with some harvest data is also to be associated with the same harvest data because there is only one way to conveniently remove labels from a roll, and because the unique codes are sequential, or are encryptions of sequential plain text codes.

Figure 14:
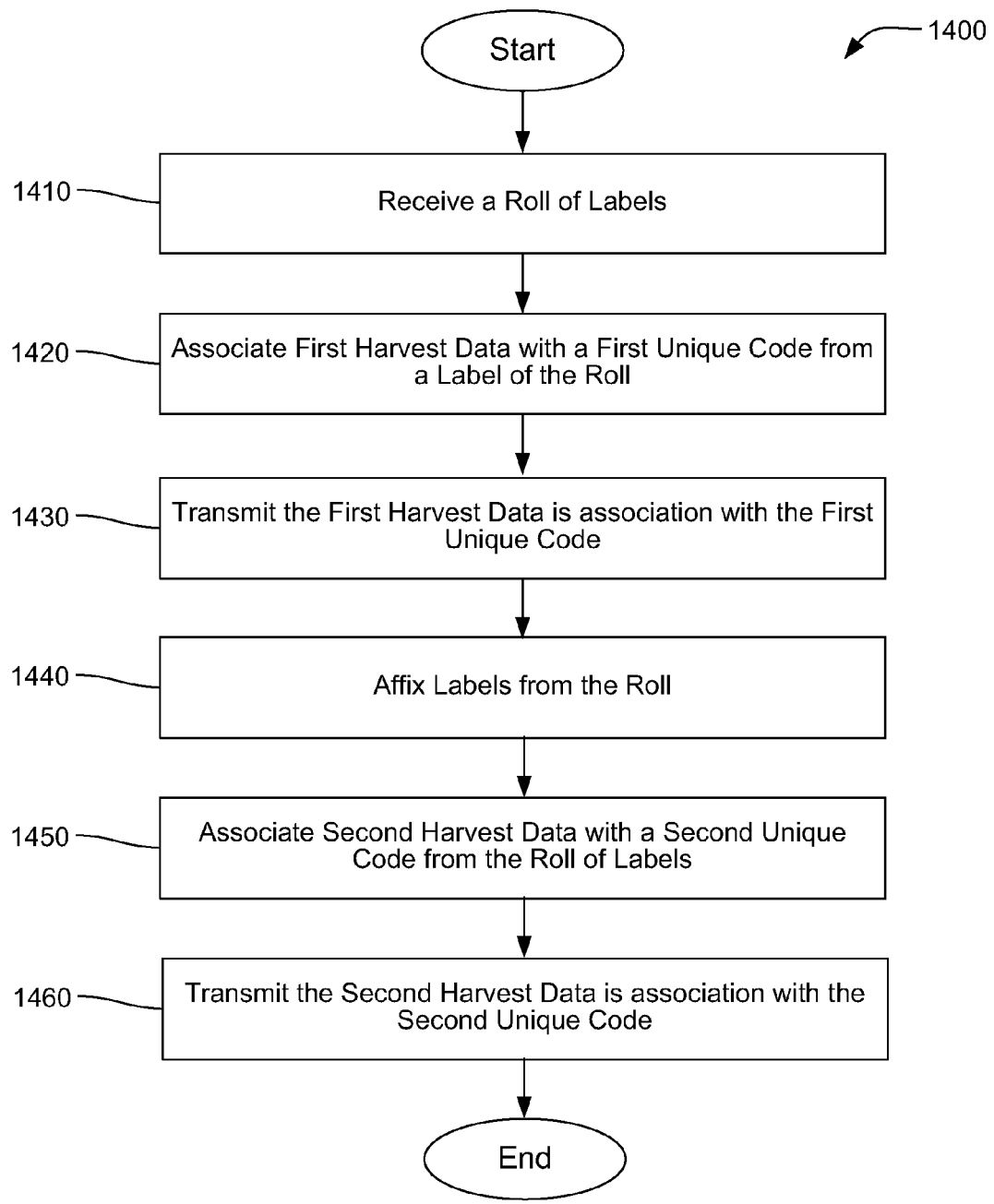
FIG. 14 provides a flowchart representation of a method for associating information with harvested produce according to another exemplary embodiment of the present invention.

FIG. 14 provides a flowchart representation of a method 1400 for associating information with harvested produce according to still another exemplary embodiment of the present invention. The method 1400 comprises a step 1410 of receiving a roll of labels, a step 1420 of associating first harvest data with a first unique code, a step 1430 of affixing labels from the roll, and a step 1440 of transmitting the first unique code in association with the first harvest data. Optionally, the method 1400 further comprises a step 1450 of associating second harvest data with a second unique code and a step 1460 of transmitting the second unique code in association with the second harvest data.

Figure 15:
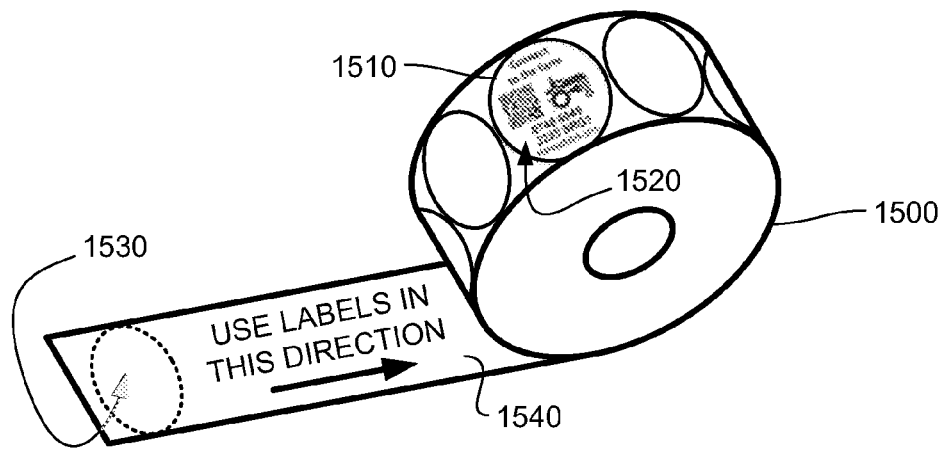
FIG. 15 shows a roll of labels according to another exemplary embodiment of the present invention.

With additional reference to FIG. 15, step 1410 of method 1400 comprises receiving a roll 1500 of labels 1510, where each label 1510 of the roll 1500 sequentially includes a unique code 1520 from a batch of unique codes, the unique codes 1520 spanning a range from an initial unique code to a final unique code, an initial label 1530 of the roll 1500 including the initial unique code and a final label (not shown) of the roll 1500 including the final unique code. The unique codes 1520 can be printed in both human-readable and machine-readable formats, as illustrated. The label backing layer 1540 can be printed with use instructions, as shown, to help where strips of labels 1510 are removed from the roll 1500, for example.

Returning to FIG. 14, step 1420 comprises associating first harvest data with a first unique code 1520 of a label 1510 of the roll 1500. In some instances a picker may employ a hand-held device such as the one illustrated in U.S. patent application Ser. No. 12/908,667 filed on Oct. 20, 2010 entitled "Methods for Correlating First Mile and Last Mile Product Data," incorporated herein by reference, and adapted to enter harvest data and to read unique codes 1520. In these embodiments, associating first harvest data with a first unique code 1520 comprises entering harvest data into the hand-held device and reading a unique code 1520 from a label 1510. In some embodiments the hand-held device is configured to lead a picker through the steps needed to make the association by prompting for the harvest information then prompting the picker to read a label 1510. In some embodiments, and with reference to step 1430, the hand-held device is configured to wirelessly transmit the harvest data and unique codes 1520 to the computing device that receives the same in step 1340 of method 1300. In other instances, the hand-held device stores the harvest data in association with the read unique codes 1520 until docked to another computing device that transmits the same. As noted previously, the hand-held device can add a time stamp and/or location coordinates to records associating harvest data and unique codes 1520.

Figure 16:
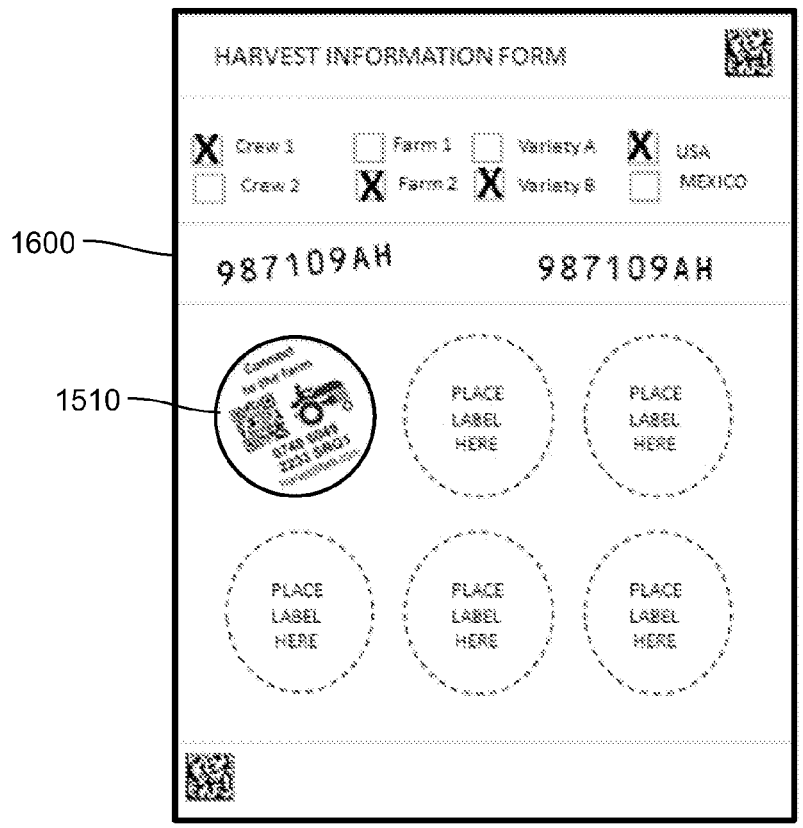
FIG. 16 shows a harvest form according to another exemplary embodiment of the present invention.

In other embodiments, associating first harvest data with a first unique code 1520 of a label 1510 in step 1420 comprises removing the label 1510 from the roll 1500 and affixing the label 1510 to a harvest form such as harvest form 1600 of FIG. 16. Like harvest forms 100 and 600 described previously herein, a picker can record harvest data on the harvest form 1600 and affix labels 1510 thereto as each new roll 1500, or strip thereof, is put into use. Ideally, one affixes the initial label 1530 of the roll 1500, or the first label 1510 of a strip, to the harvest form 1600, but any label 1510 can suffice. Step 1420 in these embodiments further comprises transferring the harvest data and the unique codes 1520 from the labels 1510 on used harvest forms 1600 to electronic records and, in step 1430, transmitting these records to the computing device that receives the same in step 1340 of method 1300, as generally described elsewhere herein.

Step 1440 of method 1400 comprises affixing labels 1510 from the roll 1500 to item-level packages or individual items of produce (e.g., squashes and melons), as described generally with respect to step 320 of method 300 (FIG. 3). It will be appreciated that although step 1440 follows step 1430, in some embodiments labels 1510 are affixed in step 1440 before harvest data and unique codes 1520 are transferred from harvest forms 1600 and transmitted in step 1430.

In some instances a roll 1500 may be only partially used with respect to a particular harvest event. Partially used rolls 1500 can be used with subsequent harvest events, and in these embodiments method 1400 further comprises the step 1450 of associating second harvest data with a second unique code 1520 from the roll 1500, and the step 1460 of transmitting the second unique code 1520 in association with the second harvest data. These steps, and the step of affixing labels, are repeated as described with respect to steps 1420-1440 until the roll 1500 is depleted.

Computing systems referred to herein can comprise an integrated circuit, microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. Computer-implemented steps of the methods noted herein can comprise a set of instructions stored on a computer-readable medium that when executed cause the computing system to perform the steps. A computer-readable medium, as used herein, specifically excludes carrier waves.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
   generating a batch of unique codes with a first computing device, the codes spanning a first range from an initial code to a final code, and storing the batch of unique codes in a database;
   transmitting the batch of unique codes to a second computing device;
   receiving a first unique code in association with first harvest data from a third computing device after transmitting the batch of unique codes to the second computing device; and
   storing the first harvest data in association with the batch of unique codes in the database.

2. The method of claim 1 wherein the second computing device comprises a label printing device.

3. The method of claim 1 further comprising printing a roll of labels, each label of the roll sequentially printed with a different unique code from the batch, from the initial label of the roll with the initial unique code to the final label of the roll with the final unique code.

4. The method of claim 3 wherein the unique codes printed on the labels are printed in both a human-readable format and a machine-readable format.

5. The method of claim 1 wherein transmitting the batch of unique codes to the second computing device is performed over a first communication channel.

6. The method of claim 5 wherein receiving the first code in association with the first harvest data from the third computing device is performed over a second channel.

7. The method of claim 1 further comprising
receiving a second code in association with second harvest data from the third computing device, and
storing the second harvest data in association with the batch of unique codes in the database.

8. A method comprising:
receiving a roll of labels, each label of the roll sequentially including a unique code from a batch of unique codes, the unique codes spanning a range from an initial unique code to a final unique code, an initial label of the roll including the initial unique code and a final label of the roll including the final unique code;
associating first harvest data with a first unique code from a label of the roll;
affixing labels from the roll to item-level packages or individual items of produce; and
transmitting the first unique code in association with the first harvest data.

9. The method of claim 8 wherein associating the first harvest data with the first unique code includes reading the first unique code with a hand-held device.

10. The method of claim 8 wherein associating the first harvest data with the first unique code includes affixing a label from the roll to a harvest form, the label including the first unique code.

11. The method of claim 8 further comprising
associating second harvest data with a second unique code from the roll, and
transmitting the second unique code in association with the second harvest data.

* * * * *